(12) United States Patent
Yokozawa

(10) Patent No.: US 7,755,335 B2
(45) Date of Patent: Jul. 13, 2010

(54) FEED CONTROLLER

(75) Inventor: Yukio Yokozawa, Shiojiri (JP)

(73) Assignee: Seiko Epson Corporation (JP)

( * ) Notice: Subject to any disclaimer, the term of this patent is extended or adjusted under 35 U.S.C. 154(b) by 274 days.

(21) Appl. No.: 12/098,055

(22) Filed: Apr. 4, 2008

(65) Prior Publication Data
US 2008/0246449 A1 Oct. 9, 2008

(30) Foreign Application Priority Data

| Apr. 5, 2007 | (JP) | ............................. 2007-099499 |
| Feb. 19, 2008 | (JP) | ............................. 2008-037350 |
| Feb. 19, 2008 | (JP) | ............................. 2008-037351 |

(51) Int. Cl.
*G05F 1/40* (2006.01)
*G05F 1/613* (2006.01)

(52) U.S. Cl. ...................................... 323/265; 323/223

(58) Field of Classification Search ......... 323/223–225, 323/265, 266, 268, 271, 282, 285; 320/116, 320/118, 120
See application file for complete search history.

(56) References Cited

U.S. PATENT DOCUMENTS 4,935,960 A * 6/1990 Takato et al. ................. 379/413

5,717,308 A * 2/1998 Nishitani et al. ............. 396/279
6,900,624 B2 * 5/2005 Abo ............................ 323/284

FOREIGN PATENT DOCUMENTS

| JP | 10-068978 | 3/1998 |
| JP | 2005-012754 | 1/2005 |

* cited by examiner

*Primary Examiner*—Matthew V Nguyen
(74) *Attorney, Agent, or Firm*—Harness, Dickey & Pierce, P.L.C.

(57) ABSTRACT

A feed controller adopted to be included in a battery drive type device, the feed controller adopted to supply power to a predetermined load from a battery holder that obtains rated electromotive force from plural rated number of batteries having predetermined specification and connected in series while held by the battery holder, the feed controller includes: an outer casing attached to the battery holder in place of one of the plural batteries and having shape and size appropriate for being held by the battery holder; a converter unit disposed within the outer casing to receive voltage corresponding to the sum of the electromotive forces from the other batteries when the outer casing is held by the battery holder in place of the one battery and convert the supplied voltage to output voltage corresponding to the rated electromotive force; a switch unit inserted into a feed path for supplying the output from the converter unit to the predetermined load to open and close the feed path according to a feed control signal; and a feed control unit which generates the feed control signal to be supplied to the switch unit.

18 Claims, 28 Drawing Sheets

| INPUT KEY | SIGNAL BT |
|---|---|
| 1 | 10001 |
| 2 | 10010 |
| 3 | 10011 |
| 4 | 10100 |

| SIGNAL BT | FEED CONTROL SIGNAL FCS |
|---|---|
| 10001 | FEED START |
| 10010 | FEED STOP |
| 10011 | DECREASE FEED AMOUNT |
| 10100 | INCREASE FEED AMOUNT |

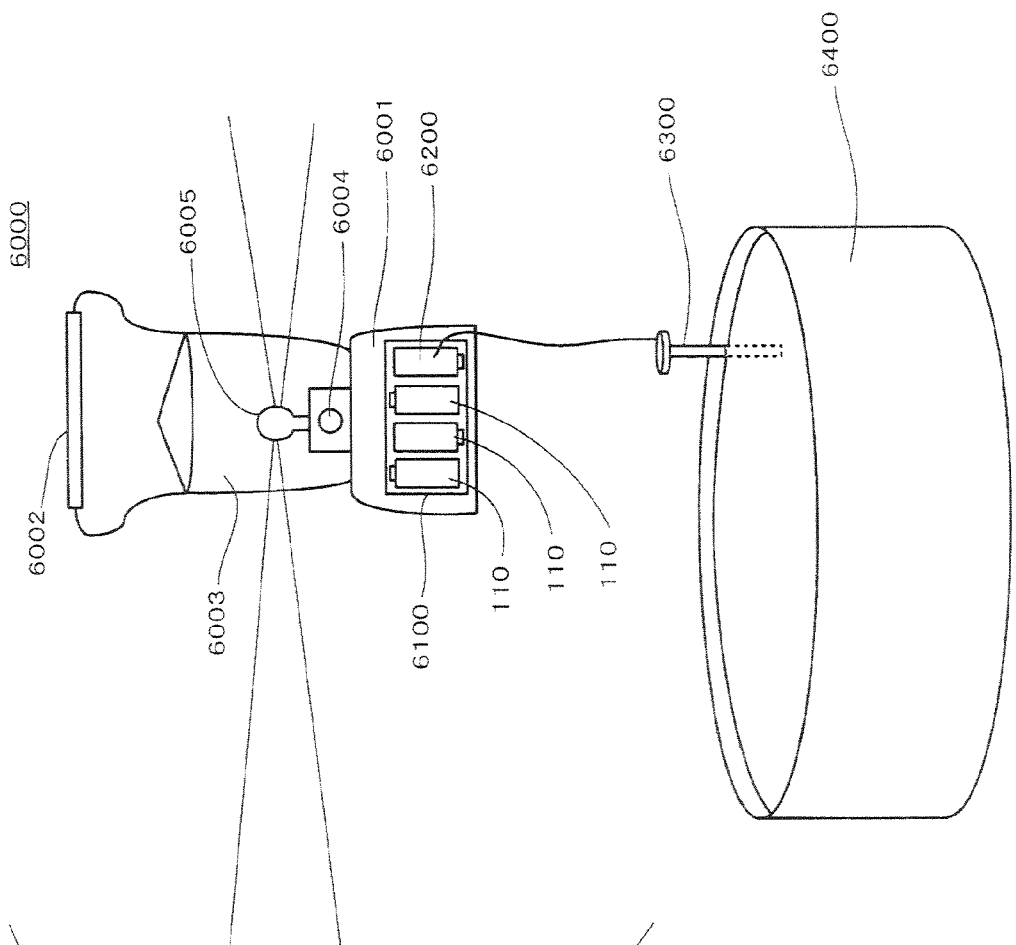
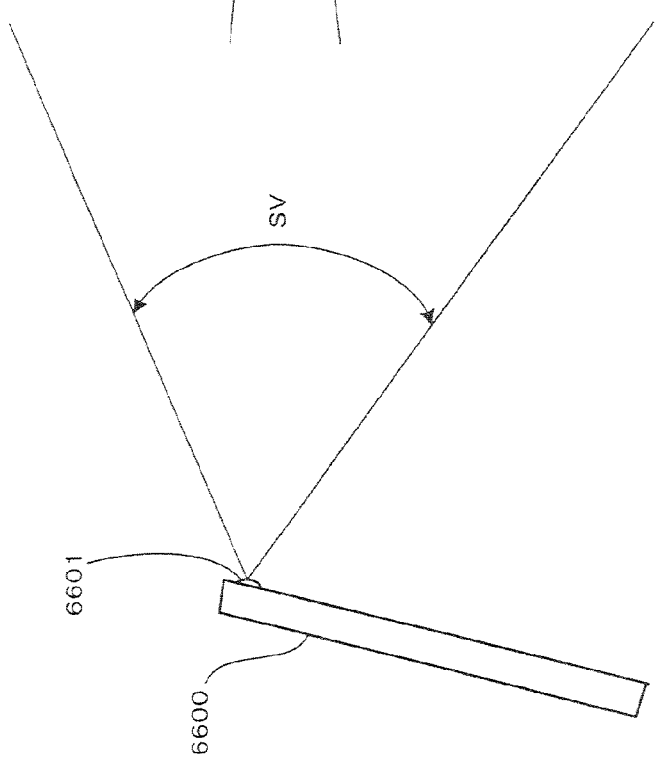
FIG.11

B = min 3.0 V ( 1.0 × 3 )

A = 1.5 × 4 = 6.0 V (REQUIRED VALUE)

FEED CONTROLLER

BACKGROUND

1. Technical Field

The present invention relates to a feed controller attached to a battery holder of a battery drive type device to control power supply to battery load.

2. Related Art

According to a technology currently proposed for a battery drive type device such as a camera to which a plurality of batteries are attachable, power is supplied to a load not by using all the attached batteries but supplied to only a main load via a secondary battery as a main power source, for example, while monitoring the remaining capacity of the secondary battery. When the remaining capacity becomes smaller than a predetermined value, electromotive force of a primary battery separately attached is boosted by a boosting circuit and supplied to charge the secondary battery (see JP-A-10-68978, paragraph 0033, FIG. 5).

In addition, a technology of co-using an optical communication device which uses flickering of a display unit as a communication device not easily affected by external noise has been proposed in the field of portable information terminal such as cellular phone and PDA (personal digital assistant) as a battery drive type device.

According to this technology, the function of the optical communication can be added only by using appropriate algorithm without necessity for addition of other separate device (see JP-A-2005-12754, paragraphs 0009-0011, FIG. 1).

According to the technology disclosed in JP-A-10-68978, the plural batteries occupying not a small space in the battery drive type device are provided to make up for decrease in the electromotive force of the device so that operation time of the battery drive type device such as a camera can be extended without charge from the outside or replacement of the batteries with new ones. However, the batteries function only as power source, and thus do not provide expansion and variation of the function of the device.

According to the technology disclosed in JP-A-2005-12754, the function of the optical communication can be added only by using appropriate algorithm. However, the distance of the light emission from the display unit of the portable information terminal is limited, which makes it difficult to provide longer communication distance currently demanded.

SUMMARY

It is an advantage of some aspects of the invention to provide a feed controller attachable to a battery holder of a battery drive type device and having a function of controlling power supply to battery load to provide extension or variation of the function of the battery drive type device. It is another expanded advantage of some aspects of the invention to provide a feed controller functioning as a communication circuit module which achieves illumination light communication by modulating illumination light protected from a lighting device based on transmission information, which lighting device provides a far longer light emission distance than that of a display unit of a portable information terminal, while positively utilizing the function of controlling power supply to battery load. According to this feed controller, an end user can arbitrarily add transmission function of optical communication to a battery drive type lighting device.

(1) A feed controller contained in a battery drive type device which supplies power to predetermined load from a battery holder which obtains rated electromotive force from plural rated number of batteries having predetermined specification and connected in series while held by the battery holder according to an aspect of the invention includes: an outer casing attached to the battery holder in place of one of the plural batteries and having shape and size appropriate for being held by the battery holder; a converter unit disposed within the outer casing to receive voltage corresponding to the sum of the electromotive forces from the other batteries when the outer casing is held by the battery holder in place of the one battery and convert the supplied voltage to output voltage corresponding to the rated electromotive force; a switch unit inserted into a feed path for supplying the output from the converter unit to the predetermined load to open and close the feed path according to a feed control signal; and a feed control unit which generates the feed control signal to be supplied to the switch unit.

According to the feed controller having the structure (1) attached to the battery holder of the battery drive type device in place of one of the plural rated number of the batteries having the predetermined specification (hereinafter referred to as real batteries), the converter unit receives voltage corresponding to the sum of the electromotive forces from the plural real batteries and generates output voltage corresponding to the rated electromotive force from the battery holder to which the rated number of the real batteries connected in series are attached.

The output from the converter unit is supplied to the main load of the battery drive type device, for example. For this supply, the switch unit is inserted into the feed path associated with the supply to open and close the feed path according to the feed control signal. Thus, power supply to the load is controlled by opening and closing the switch unit according to the feed control signal supplied from the feed control unit.

By using the feed controller attached in place of the real battery within the battery holder, the function for controlling power supply to the load of the battery can be added. Accordingly, extension and variation of the function of the battery drive type device can be achieved.

(2) It is preferable that the switch unit opens and closes a feed path to a main function unit as the load in the battery drive type device in the feed controller (1).

According to the feed controller having the structure (2), power supply to the main function unit (such as a light source of a battery drive type lighting device and a receiving circuit of a radio receiving function unit) in the battery drive type device is particularly controlled by the switch unit in the feed controller (1).

(3) It is preferable that the switch unit opens and closes the feed path to a receiving circuit as the main function unit in a radio receiver as the battery drive type device in the feed controller (2).

According to the feed controller having the structure (3), power supply to the receiving circuit of the radio receiver (function unit as radio receiver) in the battery drive type device is particularly controlled by the switch unit in the feed controller (2).

(4) It is preferable that the switch unit opens and closes the feed path to a communication function unit as the main function unit in a portable information device as the battery drive type device in the feed controller (2).

According to the feed controller having the structure (4), power supply to the communication function unit of the portable information device is particularly controlled by the switch unit in the feed controller (2).

(5) It is preferable that the switch unit opens and closes the feed path to a light source as the main function unit in a lighting device as the battery drive type device in the feed controller (2).

According to the feed controller having the structure (5), power supply to the light source of the lighting device is particularly controlled by the switch unit in the feed controller (2).

(6) It is preferable that the feed control unit generates the feed control signal based on output from a predetermined timer circuit-performing timing operation in the feed controller (1).

According to the feed controller having the structure (6), timing operation can be particularly performed for power supply to the load by the timer circuit even when the battery drive type device main body other than the batteries does not have the timer circuit in the feed controller (1).

(7) It is preferable that the feed control unit generates the feed control signal for opening and closing the feed path in a manner determined according to predetermined movement pattern based on detection output from a motion sensor in the feed controller (1).

According to the feed controller having the structure (7), power supply to the load can be particularly controlled based on the detection output from the motion sensor by shaking the feed controller attached to the battery holder along a predetermined movement track, for example, in the feed controller (1).

(8) It is preferable that the feed control unit has a voltage detecting circuit which detects voltage supplied from the other batteries when the outer casing is held by the battery holder in place of the one battery to generate the feed control signal based on voltage detected by the voltage detecting circuit in the feed controller (1).

According to the feed controller having the structure (8), power supply to the main function unit of the battery drive type device is particularly controlled by the operation of the voltage detection circuit based on the voltage supplied from the other batteries held by the battery holder in the feed controller (1).

(9) It is preferable that the outer casing obtains shape and size appropriate for being held by the battery holder when combined with other predetermined constituent member in the feed controller (1).

According to the feed controller having the structure (9), the outer casing of the feed controller combined with other predetermined constituent member can be held particularly by the battery holder in the feed controller (1). In other words, the unit itself of the feed controller having this outer casing is smaller than the real battery, and obtains the shape and size corresponding to one real battery when combined with other predetermined constituent member (this may be a component functioning as feed controller).

(10) It is preferable that the outer casing accommodates the switch unit and the feed control unit as well as the converter unit in the feed controller (1).

According to the feed controller having the structure (10), the converter unit, the switch unit, and the feed control unit are particularly disposed within one outer casing as a single unit having shape and size corresponding to one real battery, for example, in the feed controller (1).

(11) It is preferable that the constituent member accommodates the switch unit and the feed control unit in the feed controller (9).

According to the feed controller having the structure (11), the converter unit is particularly disposed on the outer casing described in (9), for example, and the switch unit and the feed control unit are particularly accommodated within the constituent member (this may having an outer casing) combined with the outer casing so as to constitute the feed controller by this combination in the feed controller (9).

(12) A feed controller contained in a battery drive type device which supplies power to predetermined load from a battery holder which obtains rated electromotive force from plural rated number of batteries having predetermined specification and connected in series while held by the battery holder according to another aspect of the invention includes: an outer casing attached to the battery holder in place of one of the plural batteries and having shape and size appropriate for being held by the battery holder; a converter unit disposed within the outer casing to receive voltage corresponding to the sum of the electromotive forces from the other batteries when the outer casing is held by the battery holder in place of the one battery and convert the supplied voltage to output voltage corresponding to the rated electromotive force; a switch unit inserted into a feed path for supplying the output from the converter unit to the predetermined load to open and close the feed path according to a feed control signal; and a feed control unit which generates the feed control signal to be supplied to the switch unit. The feed control unit has a transmission information receiving section for receiving transmission information supplied from the outside of the battery drive type device to generate the feed control signal based on the transmission information received by the transmission information receiving section.

According to the feed controller having the structure (12) attached to the battery holder of the battery drive type device in place of one of the plural rated number of the batteries having the predetermined specification (hereinafter referred to as real batteries), the converter unit receives voltage corresponding to the sum of the electromotive forces from the plural real batteries and generates output voltage corresponding to the rated electromotive force from the battery holder to which the rated number of the real batteries connected in series are attached.

The output generated from the converter unit is supplied to the main load of the battery drive type device, for example. For this supply, the switch unit is inserted into the feed path associated with the supply to open and close the feed oath according to the feed control signal. Thus, power supply to the load is controlled by opening and closing the switch unit according to the feed control signal supplied from the feed control unit.

In this case, the feed control unit has the transmission information receiving section for receiving transmission information supplied from the outside of the battery drive type device to generate the feed control signal based on the transmission information received by the transmission information receiving section.

Thus, power supply to the load can be remotely controlled according to a wireless signal by the function of the feed controller attached to the battery holder in place of the real battery within the battery holder even when a structure performing remote operation is not provided on the battery drive type device main body other than the batteries. Moreover, the function of the communication function unit as the load can be modulated according to the wireless signal.

(13) It is preferable that the outer casing is so constructed as to be appropriate for a battery holder of a lighting device as the battery drive type device, and that the switch unit is inserted into a power supply path to a light source of the lighting device as the load. In this case, it is preferable that the feed control unit generates the feed control signal for modulating illumination light emitted from the light source according to the transmission information received by the transmission information receiving section in the feed controller (12).

According to the feed controller having the structure (13), illumination light communication can be particularly achieved by modulating illumination light projected from the lighting device such as battery drive type flashlight according to the transmission information in the feed controller (12). In this case, the feed controller functions as a communication circuit module as a circuit unit attached to the battery holder and adding the communication function to the device main body. More specifically, power supply to the light source of the lighting device is controlled such that illumination light can be modulated by the feed control unit according to the transmission information received by the transmission information receiving section which receives the transmission information supplied as a wireless signal or a detection signal from a sensor.

Thus, the light source of the lighting device is modulated in such a manner as to flicker according to the transmission information, and is projected onto the communication target as a signal conforming to a predetermined code system such as Morse signal.

(14) It is preferable that the transmission information receiving section has short-distance high-speed wireless network interface suited for predetermined mobile communication to receive the transmission information by using the short-distance high-speed wireless network interface in the feed controller (12).

According to the feed controller having the structure (14), the transmission information receiving section particularly receives transmission information through the short-distance high-speed wireless network interface which is applicable to predetermined mobile communication such as bluetooth (registered trademark) interface in the feed controller (12). Thus, the feed controller receives the transmission information by the method described above from cellular phone, portable information terminal, or the like.

(15) it is preferable that the short-distance high-speed interface receives a short-distance high-speed wireless signal generated from a predetermined PDA in the feed controller (14).

According to the feed controller having the structure (15), the short-distance high-speed wireless network interface particularly receives transmission information produced by the predetermined PDA and supplied as a signal conforming to bluetooth (registered trademark), for example, in the feed controller (14).

Thus, the predetermined PDA can be used as an input unit for inputting a transmission signal to an illumination light communication device as to achieve communication.

(16) It is preferable that the transmission information receiving section has a sensor interface for receiving information obtained from a sensor detecting an amount of a predetermined material phenomenon condition in the feed controller (12).

According to the feed controller having the structure (16), information obtained by the sensor which detects the amount of predetermined material phenomenon condition such as temperature, pressure, and flow amount is particularly received through the sensor interface in the feed controller (12). The amount of the material phenomenon condition thus received is transmitted to the communication target by the illumination light communication from the lighting device through the above feed controller functioning as the communication circuit module equivalent to the circuit unit for adding the communication function to the device main body.

(17) It is preferable that the sensor interface receives information received by a predetermined temperature sensor in the feed controller (16).

According to the feed controller having the structure (17), a detection value of temperature as transmission information obtained by the temperature sensor is particularly received through the sensor interface, and transmitted to the communication target by the illumination light communication from the lighting device through the above feed controller functioning as the communication circuit module equivalent to the circuit unit for adding the communication function to the device main body in the feed controller (16).

(18) It is preferable that the feed control unit generates the feed control signal such that the transmission information received by the transmission information receiving section can be carried on an optical signal conforming to a predetermined code system in the feed controller (12).

According to the feed controller having the structure (18), the feed control unit particularly controls power supply to the light source such that the transmission information received by the transmission information receiving section can be carried on an optical signal conforming to the predetermined code system in the feed controller (12). Thus, the transmission information is transmitted to the communication target on the receiving system side as a signal produced by flickering or blinking of illumination light from the lighting device in a manner identifiable from other light.

BRIEF DESCRIPTION OF THE DRAWINGS

The invention will be described with reference to the accompanying drawings, wherein like numbers reference like elements.

FIG. 5 illustrates an example of the contents of a conversion table contained in a portable information terminal performing remote control of the battery drive type device main body shown in FIG. 4.

FIG. 6 shows an example of the contents of a signal conversion table contained in a feed control unit of a feed controller of the battery drive type device main body shown in FIG. 4.

FIG. 11 illustrates a concept of another use condition example of the feed controller as an example of the invention attached to the battery drive type device main body to add optical communication function to the battery drive type device main body.

FIGS. 24A and 24E illustrate a still further structure example of the feed controller as an example of the invention.

DESCRIPTION OF EXEMPLARY EMBODIMENTS

Embodiments according to the invention are hereinafter described with reference to the drawings. For easy understanding of the description, main parts as main subjects in the description are appropriately exaggerated in the figures, while other parts are simplified or eliminated. Also, a part of the internal structure is clearly indicated by solid lines in an appropriate manner.

Figure 1:
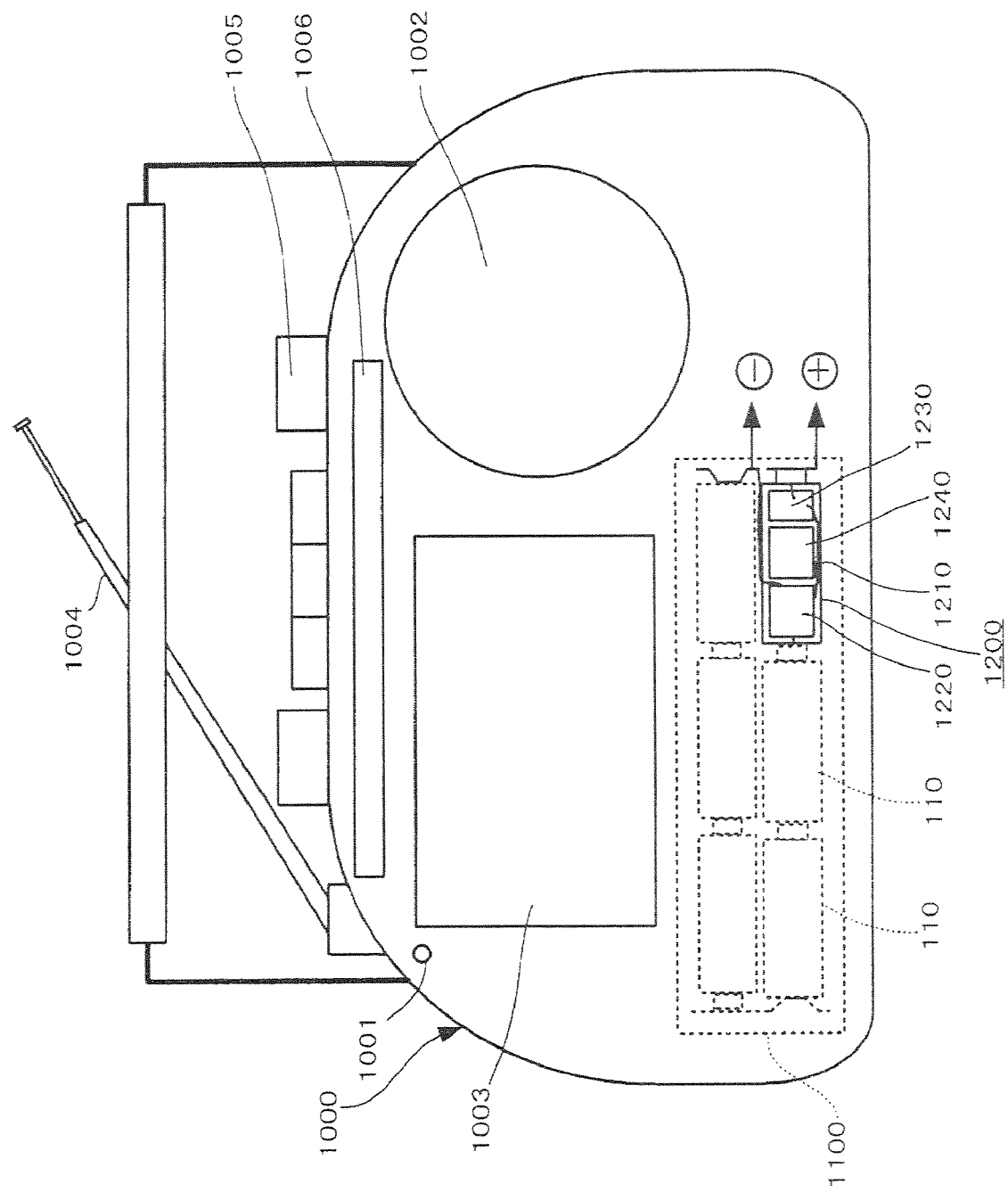
FIG. 1 illustrates an audio recording and reproducing device as a battery drive type device including a battery holder to which a feed controller as an example of the invention is attached.

FIG. 1 illustrates an audio recording and reproducing device as a battery drive type device including a feed controller as an example of the invention attached to a battery holder.

An audio recording and reproducing device 1000 illustrated in FIG. 1 includes an audio recording microphone 1001, an audio output speaker 1002, a deck unit 1003 containing a recording medium drive section and a recording/reproducing head and the like, and other components. The audio recording and reproducing device 1000 has an ordinary structure so designed as to supply rated electromotive force produced by the rated number (six in the example shown in the figure) of secondary batteries (nickel hydrogen charging battery) 110, 110 connected in series in conformity with predetermined standard and attached to a battery holder 1100 as a power source for supplying the rated electromotive force to the corresponding components such as the recoding medium drive unit and circuits to perform the operation associated with audio recording and reproducing.

The audio recording and reproducing device 1000 has a radio receiving function unit containing a not-shown receiving circuit which demodulates radio broadcast received by an antenna 1004 and outputs audio through the speaker 1002. The radio receiving function unit is so constructed as to perform tuning operation based on indication of a tuning indicator 1006 by operating a tuning dial 1005.

A feed controller 1200 as an example of the invention has an outer casing 1210 shaped and sized to be held by the battery holder 1100 in place of one of the six batteries (hereinafter referred to as "real batteries") 110, 110.

The outer casing 1210 contains a converter unit 1220 which receives voltage corresponding to the sum of the electromotive forces of the other batteries and converts the supplied voltage into output voltage corresponding to rated electromotive force attached to the battery holder 1100 under the condition in which the outer casing 1210 is held by the battery holder 1100 in place of one of the six real batteries 110, 110 as discussed above, a switch unit 1230 inserted into a feed path 1221 through which the output from the converter unit 1220 to the corresponding parts such as the recording medium drive unit and circuits as predetermined loads to open and close the feed path 1221 according to a feed control signal FCS, and a feed control unit 1240 which generates the feed control signal FCS to be supplied to the switch unit 1230. The controls for opening and closing the feed path 1221 performed by the switch unit 1230 include control for supplying the output from the converter unit 1220 to the predetermined loads, control for cutting off the supply of the output from the converter unit 1220 to the predetermined loads, and control over the supply amount of the output from the converter unit 1220 to the predetermined loads within the range of output voltage corresponding to the rated electromotive force (this is true in the following description).

Figure 2:
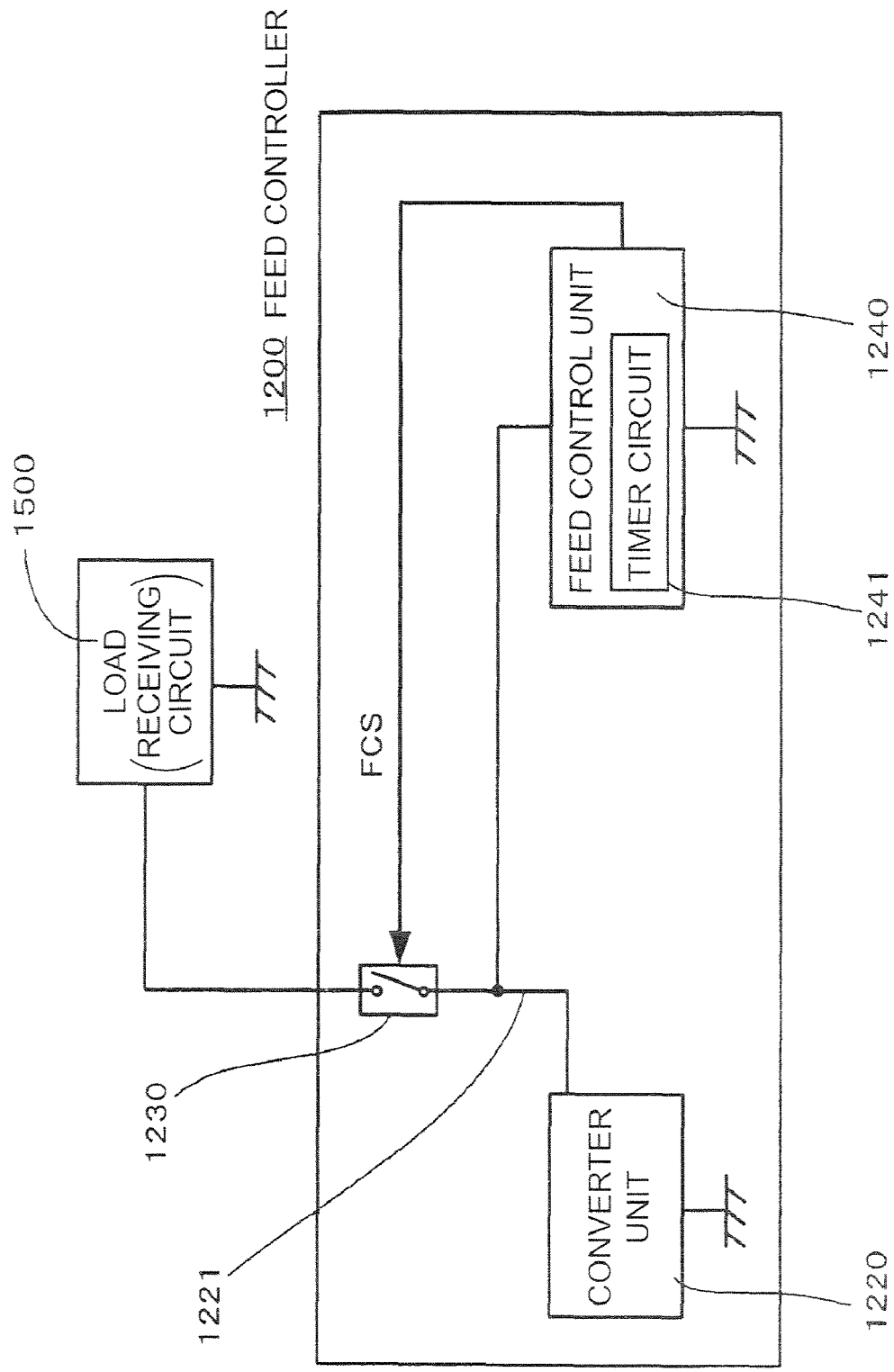
FIG. 2 is a circuit diagram showing a structure example of the feed controller shown in FIG. 1.

FIG. 2 is a circuit diagram illustrating an example of the feed controller shown in FIG. 1. Though not shown in the figure, the primary side (input side) of the converter unit 1220 is so constructed as to receive voltage corresponding to the sum of the electromotive forces of the real batteries other than the battery replaced with the feed controller 1200 as shown in FIG. 1. The secondary side (output side) is so constructed as to supply power to a receiving circuit 1500 of the radio receiving function unit (corresponding to main function unit of battery drive type device) as a load.

The switch unit 1230 for opening and closing the feed path 1221 according to the feed control signal FCS generated from the feed control unit 1240 is inserted into the feed path 1221. The operation power source for the feed control unit 1240 is supplied from the converter unit 1220 without intervention of the switch unit 1230.

Particularly, the feed control unit 1240 has a timer circuit 1241 for performing timing operation. The timer circuit 1241 is so constructed as to set arbitrary time according to the circumferential rotation angle of twisting or other operation at a coaxially and relatively movable portion of the outer casing 1210 of the feed controller 1200, for example.

When the feed controller 1200 including the timer circuit 1241 within the feed control unit 1240 is attached to the battery holder in place of the one real battery, the audio recording and reproducing device 1000 (its radio receiving function unit) performs timing operation using the timer even in the simple structure which executes battery driving only by real batteries without using the timer function.

Obviously, the feed control unit 1240 may be so constructed as to obtain on-timer function or off-timer function, or to select either of these timer functions by the timing operation of the timer.

While the audio recording and reproducing device 1000 which includes the battery drive type device having the radio receiving function unit has been described in detail with reference to FIGS. 1 and 2, the device to which the feed controller as an example of the invention is appropriately applicable is not limited to the audio recording and reproducing device 1000 discussed above.

For example, when the feed controller as an example of the invention is applied to devices such as a battery drive type device smaller than the audio recording and reproducing device 1000 and exclusively used for providing radio receiving function, a portable information device, and a lighting device, these devices having no timer function and the like in the ordinary specification can be used as devices already provided with timer function.

When the feed controller as an example of the invention is applied to a portable information device, the load as the target of feed control by the feed controller corresponds to a communication function unit as a main function unit of the portable information device.

When the feed controller as an example of the invention is applied to a lighting device, the load as the target of feed control by the feed controller corresponds to a light source as a main function unit of the lighting device.

According to these examples, the functions discussed above can be added to the battery drive type device main body without burden imposed on the device main body. Thus, the feed controller as an example of the invention can be applied to a known old-type battery drive type device without causing any problems.

Figure 3:
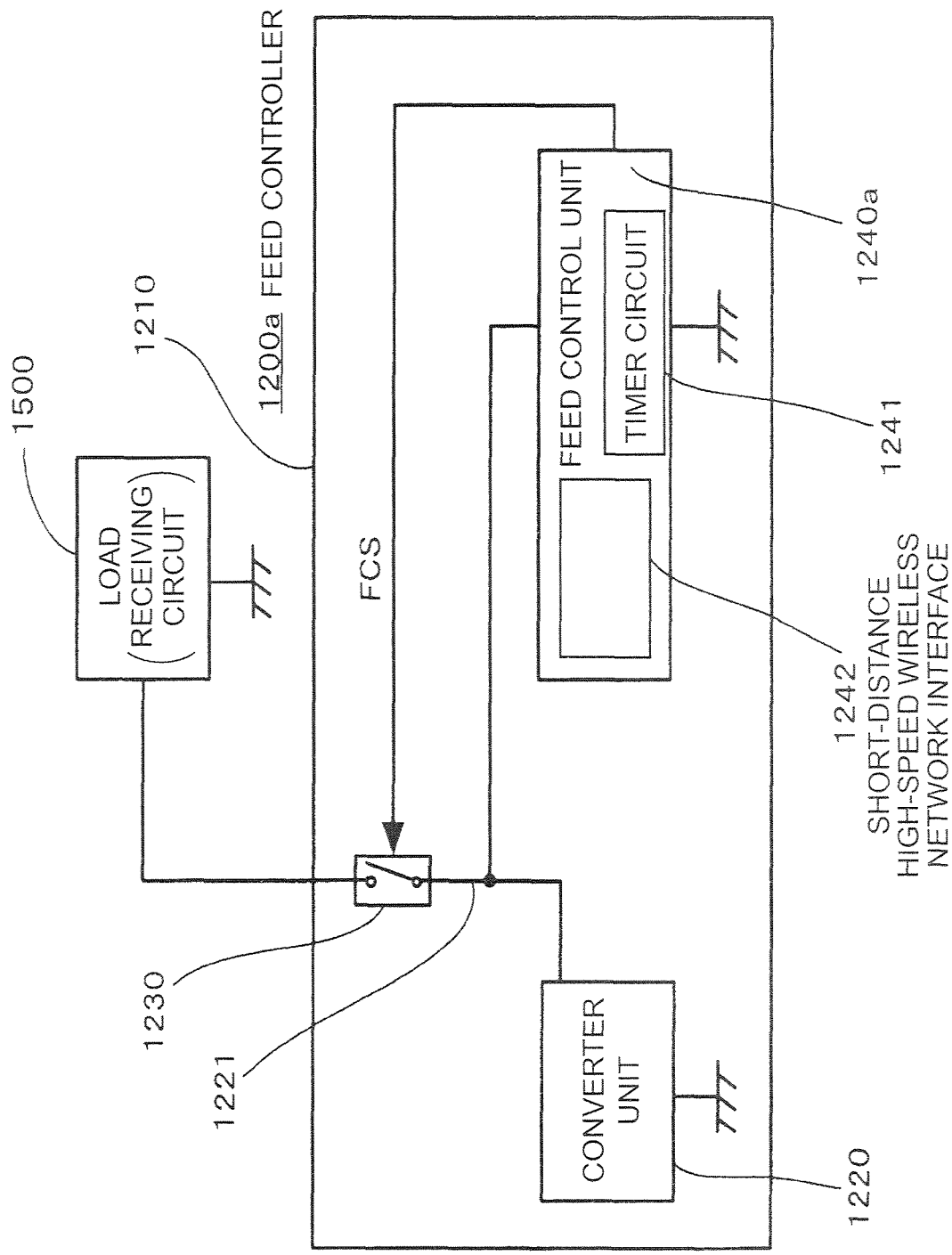
FIG. 3 is circuit diagram showing another structure example of the feed controller shown in FIG. 1.

FIG. 3 is a circuit diagram showing a feed controller in another example shown in FIG. 1. In FIG. 3, similar reference numbers are given to similar component described above and shown in FIG. 2, and explanation of each part is not repeated.

While the feed control unit 1240 of the feed controller 1200 shown in FIG. 2 has the timer circuit 1241 to add the timer function to the battery drive type device containing the feed controller 1200, a feed control unit 1240a of a feed controller 1200a shown in FIG. 3 has a short-distance high-speed wireless network interface 1242 as well.

The short-distance high-speed wireless network interface 1242 provides communication based on a system conforming to bluetooth or IEEE802.11 adopted by PDA and cellular phone.

Thus, the feed control unit 1240a shown in FIG. 3 receives a wireless signal (control signal) from external PDA or cellular phone via the short-distance high-speed wireless network interface 1242 and generates the feed control signal FCS in accordance with the received contents to open and close the switch unit 1230 for connection and disconnection between the feed path 1221 and the loads (such as receiving circuit). As a result, power supply to the loads can be remotely controlled by using the PDA and cellular phone.

Similarly to the feed controller 1200 shown in FIG. 2, the feed control unit 1200a shown in FIG. 3 is effectively applicable to various types of battery type drive device other than the audio recording and reproducing device 1000 shown in FIG. 1.

Figure 4:
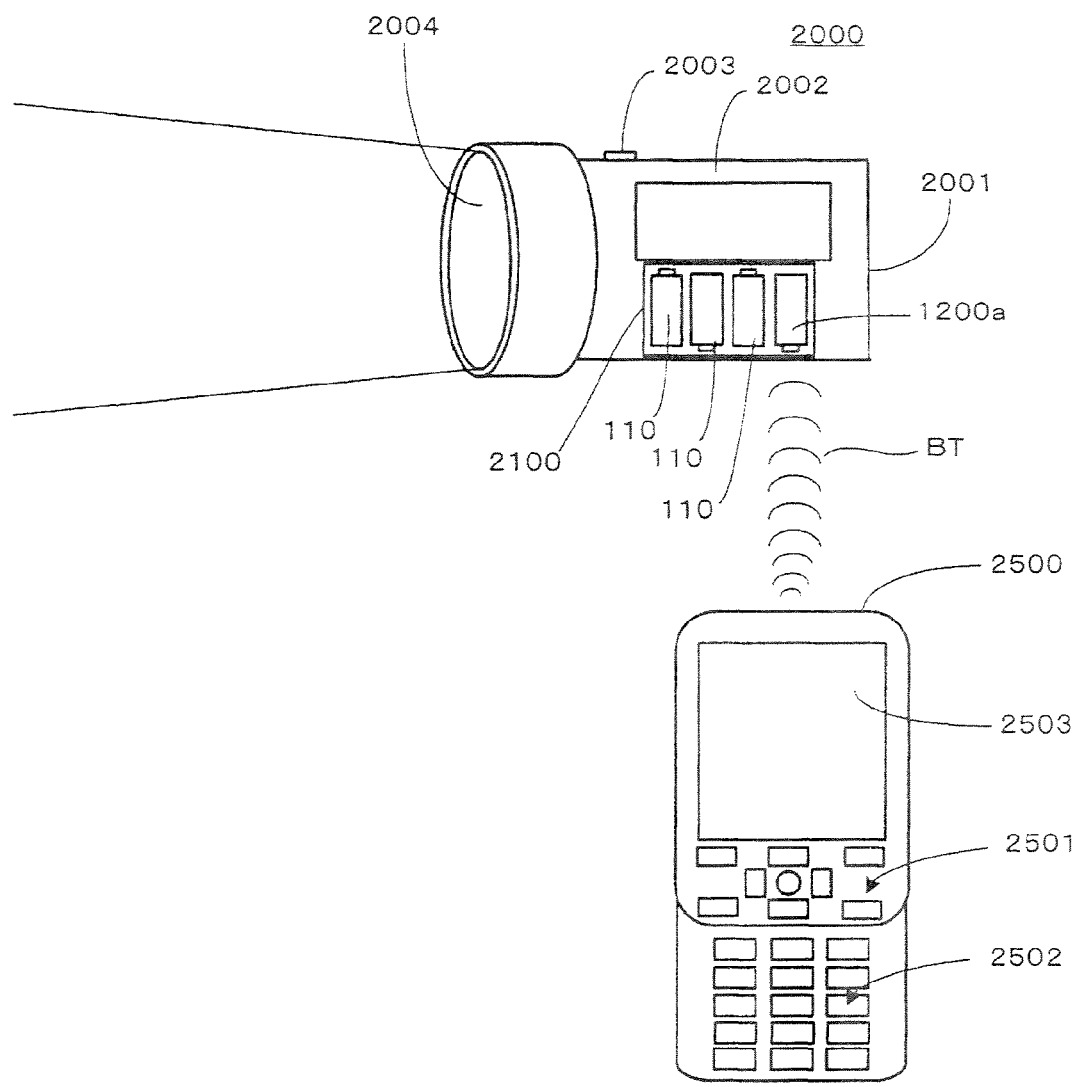
FIG. 4 illustrates a concept of a use condition example of the feed controller shown in FIG. 3 attached to the battery drive type device main body to add a remote operation function to the battery drive type device main body.

FIG. 4 illustrates a concept of a use condition example of the feed controller shown in FIG. 3 attached to the battery drive type device main body to add the remote control function to the battery drive type device main body. In this case, the feed controller as an example of the invention functions as signal receiving circuit module and signal converting circuit module as a circuit unit for adding the remote control function to the device main body. FIG. 5 shows an example of the contents of a conversion table included in the portable information terminal which performs remote control over the battery drive type device main body shown in FIG. 4. FIG. 6 shows an example of the contents of a signal conversion table included in the feed control unit of the feed controller of the battery drive type device main body shown in FIG. 4.

As illustrated in FIG. 4, a battery holder 2100 to which four dry batteries according to the standard specification are attached to the inside of a main body 2001 of a flashlight 2000 as a battery drive type lighting device.

As will be described in detail later with reference to the associated figure, the three batteries (real batteries for generating electromotive force) 110, 110, 110 and the one feed controller 1200a having the same shape and size as those of each battery in the external appearance are attached to the battery holder 2100.

A holding portion 2002 extending in the front-rear direction is provided in the upper region of the main body 2001 of the flashlight 2000, and a manual power source switch 2003 is disposed at an appropriate position in the vicinity of the front end of the holding portion 2002.

The flashlight 2000 projects illumination light emitted from a not-shown light source such as high-luminance LED through a light emission surface 2004 made of transparent protection material toward the outside front with predetermined directivity.

According to the flashlight 2000, the feed control unit 1240a receives a wireless signal (control signal) from external PDA or cellular phone via the short-distance high-speed wireless network interface 1242. Then, the feed control unit 1240a generates the feed control signal FCS corresponding to the contents of the received control signal, and opens or closes the switch unit 1230 according to the feed control signal FCS to control power supply to the light source. By this method, power supply to the light source of the flashlight 2000 can be remotely controlled by using the PDA or cellular phone.

In the example shown in FIG. 4, the control signal for remote control over the flashlight 2000 is sent from a portable information terminal 2500 such as a cellular phone having particular specification to the feed controller 1200a within the main body 2001 of the flashlight 2000 as a signal BT conforming to bluetooth or the like adopted in short-distance high-speed wireless communication.

The portable information terminal 2500 has function keys 2501, character input keys 2502, and a display 2503, and is so constructed as to provide short-distance high-speed wireless communication by using the bluetooth signal BT similarly to a known device of this type.

A user transmitting control information supplies control information to the feed controller 1200a through key input operation or the like via the portable information terminal 2500 by using the bluetooth signal BT.

In the portable information terminal 2500, control information for performing remote control over the flashlight 2000 has been allocated to each of the plural keys in advance. According to the portable information terminal 2500, for example, control information for turning on the power source of the flashlight 2000 is allocated to "1" key of the character input key 2502, control information for turning off the power source of the flashlight 2000 is allocated to "2" key of the character input key 2502, control information for decreasing brightness of the light source of the flashlight 2000 is allocated to "3" key of the character input key 2502, and control information for increasing brightness of the light source of the flashlight 2000 is allocated to "4" key of the character input key 2502 in advance.

When receiving key input operation from the user, the portable information terminal 2500 generates the signal BT as a control signal for transmitting control information associated with the operated key. In this step, the portable information terminal 2500 produces the signal BT based on the conversion table 2510 showing the correspondence between the operated key and the signal BT to be transmitted. Then, the portable information terminal 2500 transmits the generated signal BT to the feed controller 1200*a*.

In the conversion table 2510 shown in FIG. 5, for example, the signal BT constituted by "10001" corresponds to the input of "1" key of the character input keys 2502, the signal BT constituted by "10010" corresponds to the input of "2" key of the character input keys 2502, the signal BT constituted by "10011" corresponds to the input of "3" key of the character input keys 2502, and the signal BT constituted by "10100" corresponds to the input of "4" key of the character input keys 2502.

When receiving the signal BT from the portable information terminal 2500 via the short-distance high-speed wireless network interface 1242, the feed control unit 1240*a* of the flashlight 2000 generates the feed control signal FCS for controlling the switch unit 1230 based on the contents of the received signal BT. In this step, the feed control unit 1240*a* produces the feed control signal FCS based on the conversion table 1244 showing the correspondence between the received signal BT and the feed control signal FCS.

In the conversion table 1244 shown in FIG. 6, for example, the feed control signal FCS for starting power supply to the light source is generated when the signal BT constituted by "10001" is received, the feed control signal FCS for cutting off power supply to the light source is generated when the signal BT constituted by "10010" is received, the feed control signal FCS for decreasing power the supply amount to the light source is generated when the signal BT constituted by "10011" is received, and the feed control signal FCS for increasing the power supply amount to the light source is generated when the signal BT constituted by "10100" is received.

The feed control unit 1240*a* having produced the feed control signal FCS transmits the produced feed control signal FCS to the switch unit 1230.

Then, the switch unit 1230 having received the feed control signal FCS controls power supply to the light source according to the feed control signal FCS.

By this method, power supply to the light source of the flashlight 2000 can be remotely controlled by using the PDA or cellular phone.

According to the technology described with reference to FIG. 4, therefore, the end user can arbitrarily add the remote operation function to the battery drive type lighting device as easily as in case of battery replacement.

Figure 7:
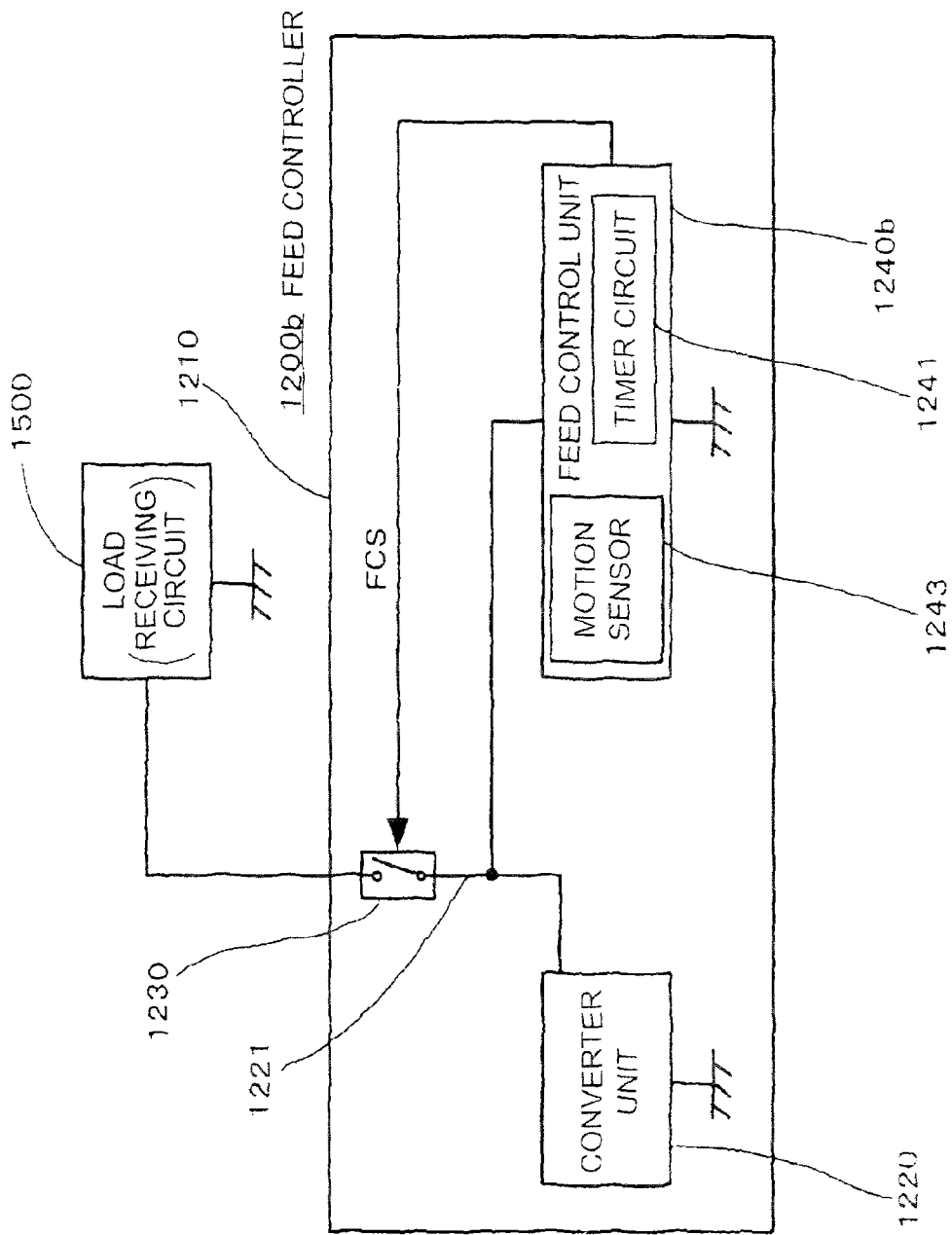
FIG. 7 is a circuit diagram showing a further structure example of the feed controller shown in FIG. 1.

FIG. 7 is a circuit diagram showing a feed controller in a further example of the feed controller shown in FIG. 1. In FIG. 7, similar reference numbers are given to similar component described above and shown in FIG. 2, and explanation of each part is not repeated.

The feed control unit 1240 of the feed controller 1200 shown in FIG. 2 has the timer circuit 1241 to add the timer function to the battery drive type device containing the feed controller 1200. On the other hand, in a feed controller 1200*b* shown in FIG. 7, a feed control unit 1240*b* has a motion sensor 1243 as well to generate the feed control signal FCS in accordance with the movement of the feed controller 1200*b* (that is, movement of the battery drive type device main body to which the feed controller 1200*b* is attached).

According to the feed controller 1200*b*, power supply to the loads can be controlled based on detection output from the motion sensor by shaking the battery drive type device along a predetermined movement track under the condition in which the feed controller is attached to the battery holder.

According to this example, the time of the timer circuit 1241 may be set at an arbitrary time or such that a predetermined step is selected in accordance with the shape of the movement track.

Similarly to the feed controller 1200 shown in FIG. 2, the feed control unit 1200*b* shown in FIG. 7 is effectively applicable to various types of battery type drive device other than the audio recording and reproducing device 1000 shown in FIG. 1.

Figure 8:
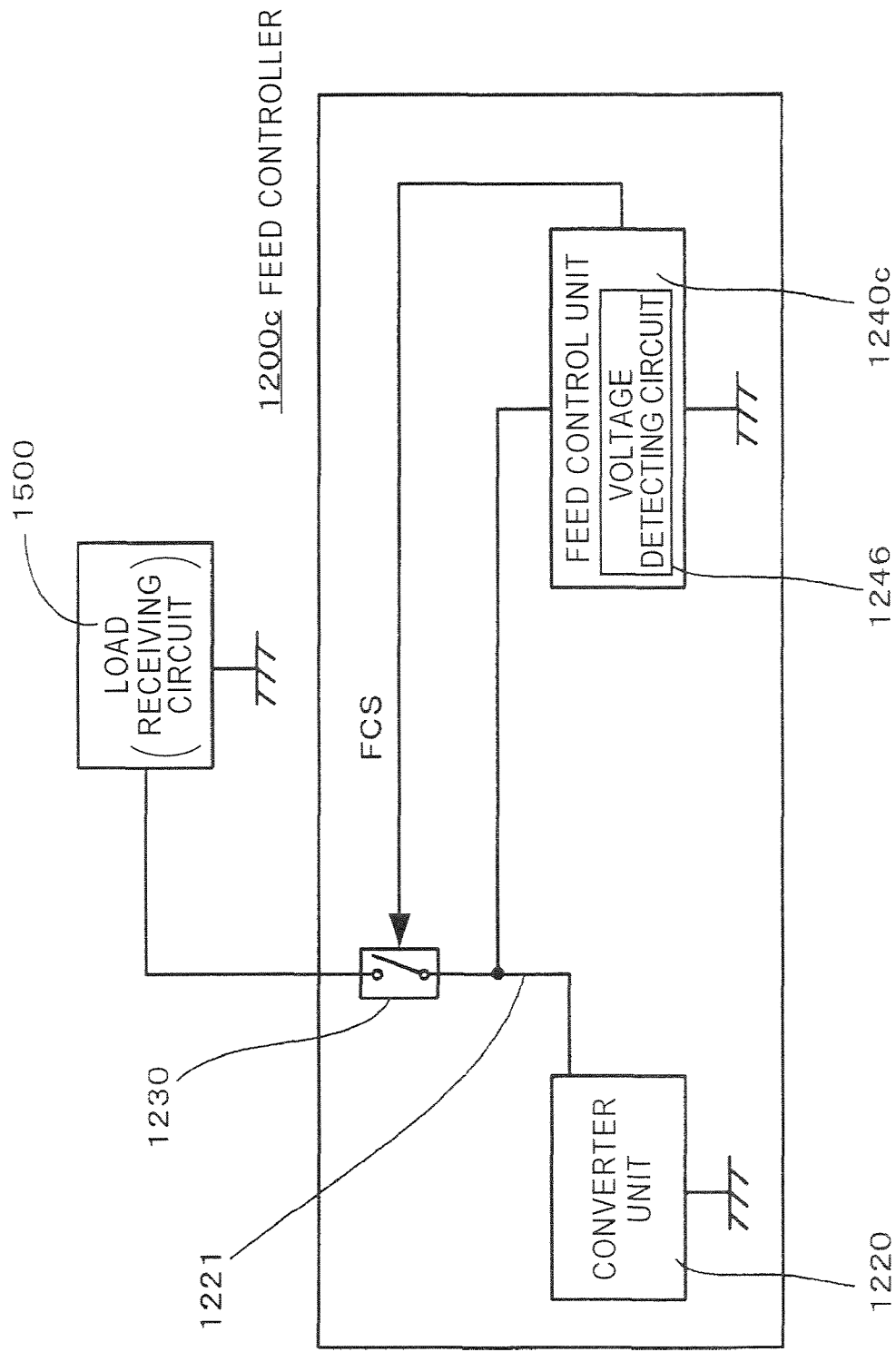
FIG. 8 is a circuit diagram showing a still further structure example of the feed controller shown in FIG. 1.

FIG. 8 is a circuit diagram showing a feed controller in a still further example of the feed controller shown in FIG. 1. In FIG. 8, similar reference numbers are given to similar component described above and shown in FIG. 2, and explanation of each part is not repeated.

While the feed control unit 1240 of the feed controller 1200 shown in FIG. 2 has the timer circuit 1241 to add the timer function to the battery drive type device containing the feed controller 1200, a feed control unit 1240*c* of a feed controller 1200*c* shown in FIG. 8 has a voltage detecting circuit 1246 instead of the timer circuit 1241.

The voltage detecting circuit 1246 is so constructed that, when the outer casing 1210 is held by the battery holder 1100 of the battery drive type device main body in lieu of one of the rated number of the real batteries 110, 110, the voltage detecting circuit 1246 detects voltage supplied from the other batteries of the real batteries 110, 110.

Then, the feed control unit 1240*c* generates the feed control signal FCS according to the voltage detected by the voltage detecting circuit 1246 to control the switch unit 1230 based on the feed control signal FCS thus generated.

By this method, the feed controller 1200*c* controls power supply to the predetermined loads according to the voltage supplied from the real batteries 110, 110.

For example, the feed control unit 1240*c* is so constructed as to control the switch unit 1230 such that the power supply amount to the predetermined loads decreases when the voltage detected by the voltage detecting circuit 1246 is lower than a predetermined threshold. Thus, energy-saving mode can be added to the battery drive type device to which the feed controller 1200*c* is attached.

Figure 9:
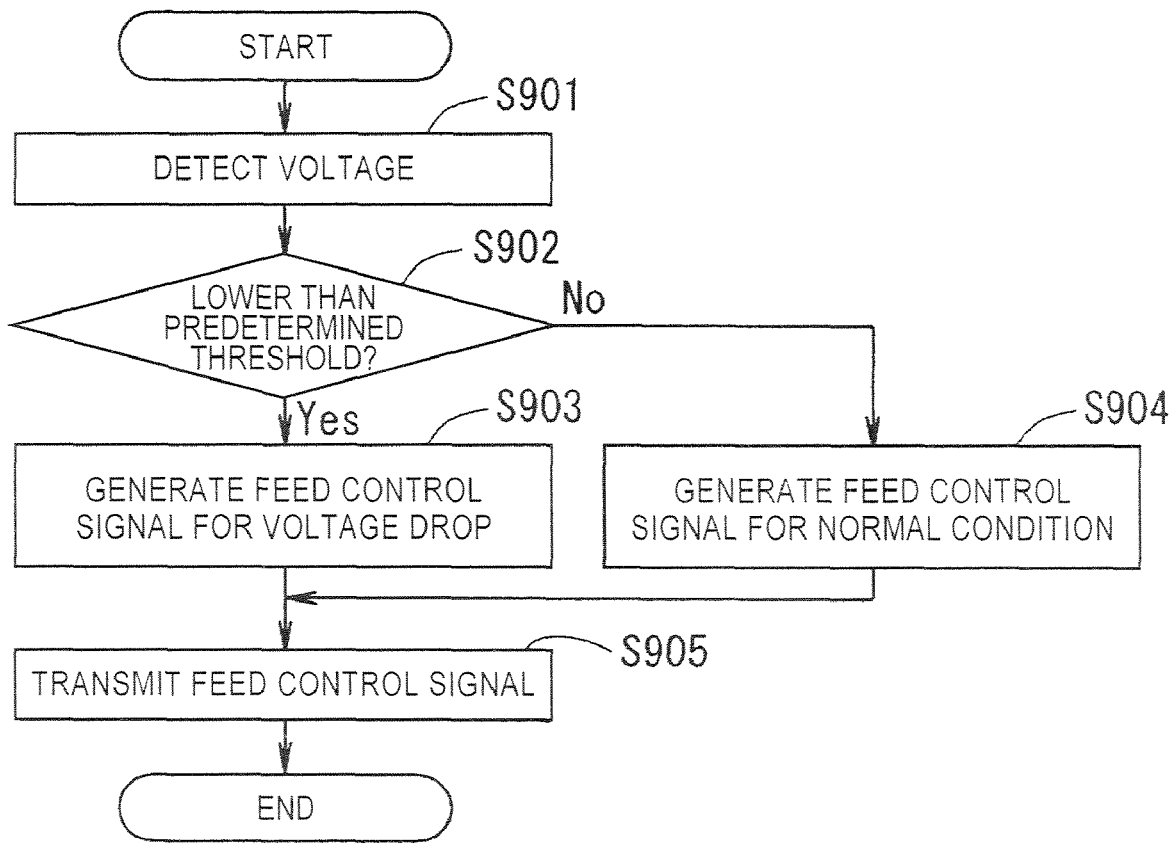
FIG. 9 is a flowchart showing process performed by a feed control unit of the feed controller shown in FIG. 8.

A use condition example of the feed controller 1200*c* shown in FIG. 8 applied to the flashlight 2000 shown in FIG. 4 is now described. The feed controller 1200*c* is provided on the flashlight 2000 in place of the feed controller 1200*a*. In this case, the feed controller as an example of the invention functions as a voltage detecting circuit module as a circuit unit for adding a function of indicating voltage drop of the real batteries to the device main body. FIG. 9 is a flowchart showing process performed by the feed control unit of the feed controller shown in FIG. 8.

The three real batteries 110, 110, 110 and the one feed controller 1200*c* are attached to the battery holder 2100 of the flashlight 2000.

Thus, the feed control unit 1240*c* of the feed controller 1200*c* performs voltage detecting process shown in FIG. 9 every time the manual power source switch 2003 of the flashlight 2000 is turned on.

More specifically, the process goes to step S901 when the voltage detecting process is initiated by the feed control unit 1240*c*.

In step S901, the voltage detecting circuit 1246 of the feed controller 1240c detects voltage supplied from the three real batteries 110, 110, and then process shifts to step S902.

In step S902, the feed control unit 1240c judges whether the detected voltage is lower than the predetermined threshold. When the detected voltage is lower than the predetermined threshold (Yes), the process proceeds to step S903. When the detected voltage is not lower than the predetermined threshold (No), the process goes to step S904.

In step S903, the feed control unit 1240c generates the feed control signal FCS for voltage drop, then the process shifts to step S905. The feed control signal FCS for voltage drop herein refers to a signal for controlling the switch unit 1230 such that the light source flickers according to predetermined pattern. The feed control signal FCS for voltage may be a signal for controlling the switch unit 1230 such that the power supply amount to the light source decreases.

In step S904, the feed control unit 1240c generates the feed control signal FCS for normal condition, and then the process goes to step S905. The feed control signal FCS for normal condition herein refers to a signal for controlling the switch unit 1230 such that rated electromotive force of the flashlight 2000 can be supplied to the light source.

In step S905, the feed control unit 1240c transmits the generated feed control signal FCS to the switch unit 1230, and the voltage detecting process ends.

The switch unit 1230 having received the feed control signal FCS from the feed control unit 1240c controls power supply to the light source according to the feed control signal FCS.

Thus, in the flashlight 2000, voltage drop of the real batteries can be indicated by flickering of the light source or by other methods when the voltage of the real batteries is lower than the threshold.

Figure 10:
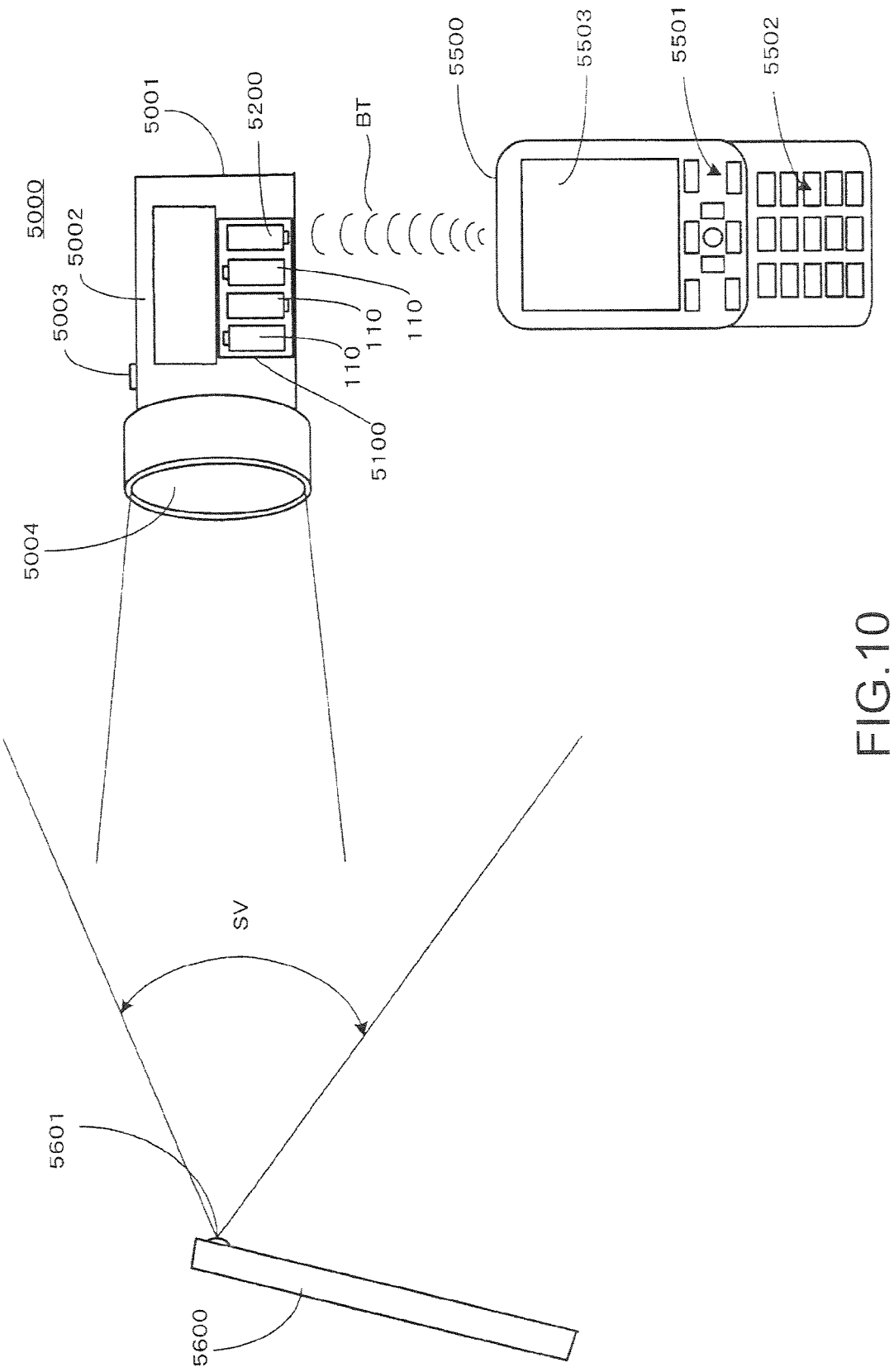
FIG. 10 illustrates a concept of a use condition example of the feed controller as an example of the invention attached to the battery drive type device main body to add optical communication function to the battery drive type device main body.

FIG. 10 illustrates a concept of a use condition example of the feed controller in the invention attached to the battery drive type device main body so as to add optical communication function to the battery drive type device main body. In this case, the feed controller as an example of the invention functions as a communication circuit module equivalent to a circuit unit for adding communication function to the device main body.

As illustrated in FIG. 10, a battery holder 5100 to which four dry batteries are attached according to the standard specification is provided within a main body 5001 of a flashlight 5000 as a battery drive type lighting device.

As will be described in detail later with reference to the associated figure, the three batteries (real batteries for generating electromotive force) 110, 110, 110 and the one feed controller 5200 having the same shape and size as those of each battery in external appearance are attached to the battery holder 5100.

A holding portion 5002 extending in the front-rear direction is provided in the upper region of the main body 5001 of the flashlight 5000, and a manual power source switch 5003 is disposed at an appropriate position in the vicinity of the front end of the holding portion 2002.

The flashlight 5000 projects illumination light emitted from a not-shown light source such as high-luminance LED through a light emission surface 5004 made of transparent protection material toward the outside front with predetermined directivity.

The flashlight 5000 controls power supply to the light source by the function of the feed controller 5200 as the communication circuit module discussed above and attached to the inside of the battery holder 5100, and provides illumination light communication by using flickering or blinking illumination light in the manner conforming to predetermined code system.

Information to be transmitted by the illumination light communication in the example shown in FIG. 10 is supplied from a portable information terminal 5500 such as a cellular phone having particular specification to the feed controller 5200 within the main body 5001 of the flashing light 5000 while carried on the short-distance high-speed wireless communication such as the signal BT conforming to bluetooth.

The portable information terminal 5500 has function keys 5501, character input keys 5502, and a display 5503 and is so constructed as to provide short-distance high-speed wireless communication by using the bluetooth signal BT similarly to a known device of this type.

The user who transmits transmission information supplies the transmission information to the feed controller 5200 functioning as the communication circuit module through key input operation or the like via the potable information terminal 5500 by using the bluetooth signal BT.

The main body 5001 of the flashlight 5000 modulates illumination light projected from the light emission surface 5004 by the function of the feed controller 5200 according to the transmission information thus supplied to transmit the transmission information by using illumination light to transmit the transmission information by using illumination light.

On the reception side of the optical communication by using illumination light, a camera 5601 of a portable information terminal 5600 which may be of the same type as the portable information terminal 5500 captures the illumination light from the flashlight 5000 as a dynamic image within an image pickup visual field SV, and demodulates the transmission information from the illumination light signal captured as the dynamic image by a known illumination light signal decoding function.

According to the technology described with reference to FIG. 10, illumination light communication can be achieved by modulating illumination light protected from the flashlight 5000 as the lighting device providing a far longer light emission distance than that of light from the display unit of the portable information terminal according to the transmission information.

Moreover, the feed controller held by the battery holder functions as the communication circuit module which modulates illumination light according to the transmission information to provide optical communication by utilizing the illumination light (thus, illumination light source itself) Accordingly, the end user can arbitrarily add the transmission function of the optical communication to the battery drive type lighting device as easily as in case of battery replacement.

FIG. 11 illustrates a concept of a use condition example of the feed controller as another example of the invention attached to the battery drive type device main body to add the function of optical communication to the battery drive type device main body. The feed controller in this example of the invention functions as the communication circuit module as the circuit unit for adding the communication function to the device main body similarly to the above examples.

As illustrated in FIG. 11, a battery holder 6100 to which four dry batteries are attached according to the standard specification is provided within a main body 6001 of an LED type lantern 6000 as a battery drive type lighting device.

As will be described in detail later with reference to the associated figure, the three batteries (real batteries for generating electromotive force) 110, 110, 110 and one feed controller 6200 having the same shape and size as those of each battery in external appearance are attached to the battery holder 6100.

A holding portion 6002 having an appropriately expanded horizontal area is provided in the upper region of the main body 6001 of the LED type lantern 6000. Also, a manual power source switch 6004 is disposed at an appropriate position on the lower front surface of a transparent cover 6003.

Illumination light emitted from a light source 6005 as a high-luminance LED is projected from the transparent cover 6003 in all of the circumferential directions without particular directivity.

The LED type lantern 6000 controls power supply to the light source by the function of the communication circuit module provided within the feed controller 6200 attached to the inside of the battery holder 6100, and provides illumination light communication by flickering or blinking of the illumination light in the manner conforming to the predetermined code system.

The transmission information to be transmitted by the illumination light communication is a detection value of the amount indicating predetermined material phenomenon condition such as temperature, pressure, and flow amount received via a sensor interface to be described later and provided on the communication circuit module (i.e., feed controller 6200) according to the example shown in FIG. 11.

By the operation of this communication circuit module 6200, the amount of the material phenomenon condition is transmitted from the LED type lantern 6000 as the lighting device to the communication target by the illumination light communication.

Particularly in the example shown in FIG. 11, water temperature of a water tank 6400 detected by a resistance thermometer bulb 6300 as a temperature sensor is received through the sensor interface.

In this case, the LED type lantern 6000 modulates illumination light projected from the light source 6005 as the high-luminance LED by the operation of the communication circuit module 6200 according to the water data of the water tank 6400 as the transmission information supplied as above to transmit the transmission information (detection value of water temperature) by using the illumination light.

On the receiving side, the illumination light received from the LED type lantern 6000 (its high luminance LED light source 6005) is captured as a dynamic image within the pickup visual field SV by a camera 6601 of a portable information terminal 6600 which may be of the same type as the portable information terminal 5600 shown in FIG. 10, and the transmission information is demodulated from the illumination light signal captured as the dynamic image by a known illumination light signal decoding function.

According to the technology described with reference to FIG. 11, illumination light communication can be achieved by modulating illumination light projected from the LED type lantern 6000 as the lighting device providing a far longer light emission distance than that of light from the display unit of the portable information terminal according to the transmission information.

Moreover, the feed controller held by the battery holder functions as the communication circuit module which modulates illumination light according to the transmission information to provide optical communication by utilizing the illumination light (thus, illumination light source itself). Accordingly, the end user can arbitrarily add the transmission function of the optical communication to the battery drive type lighting device as easily as in case of battery replacement.

Figure 12:
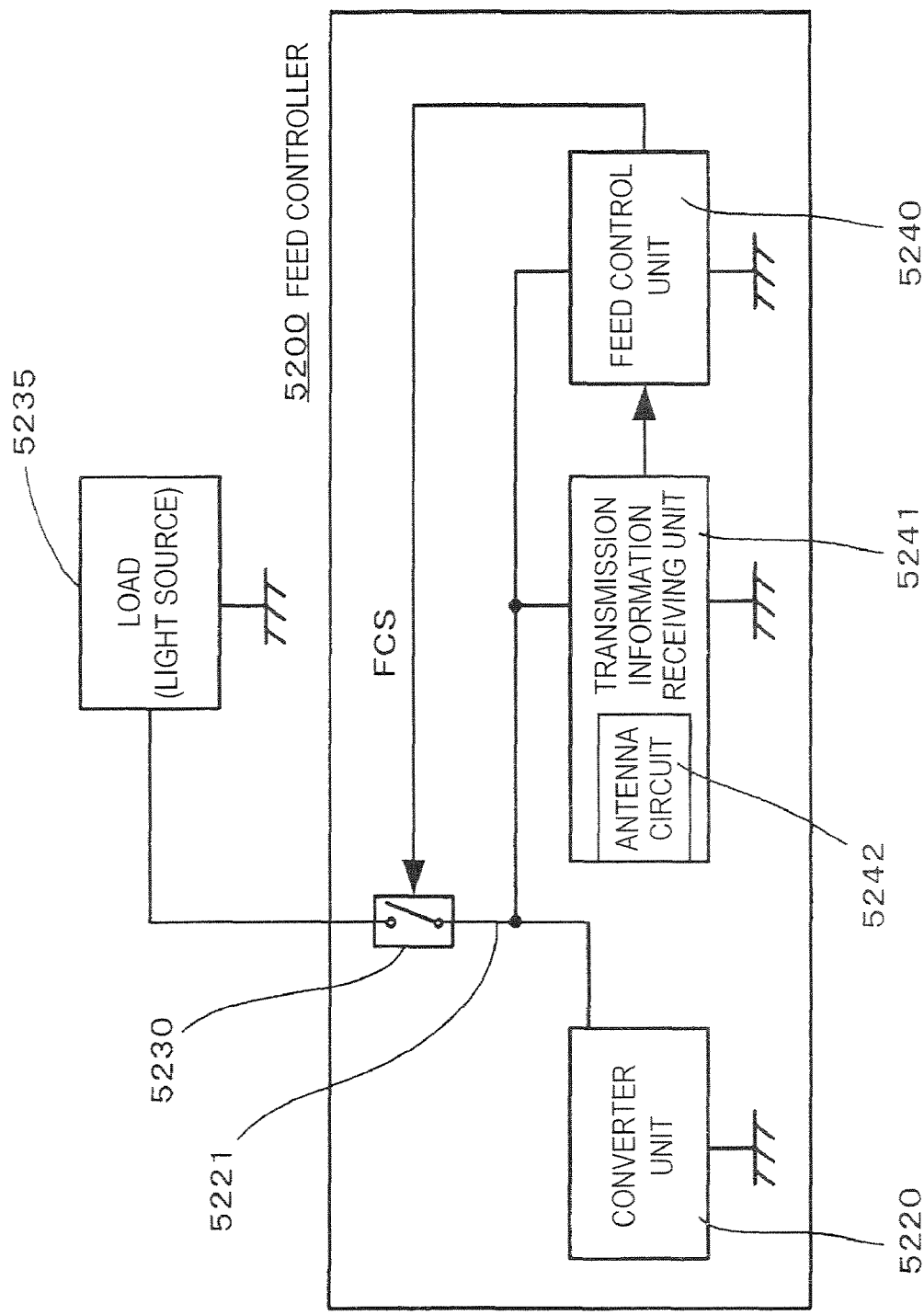
FIG. 12 is a circuit diagram showing an example of the feed controller shown in FIG. 10.
Figure 13:
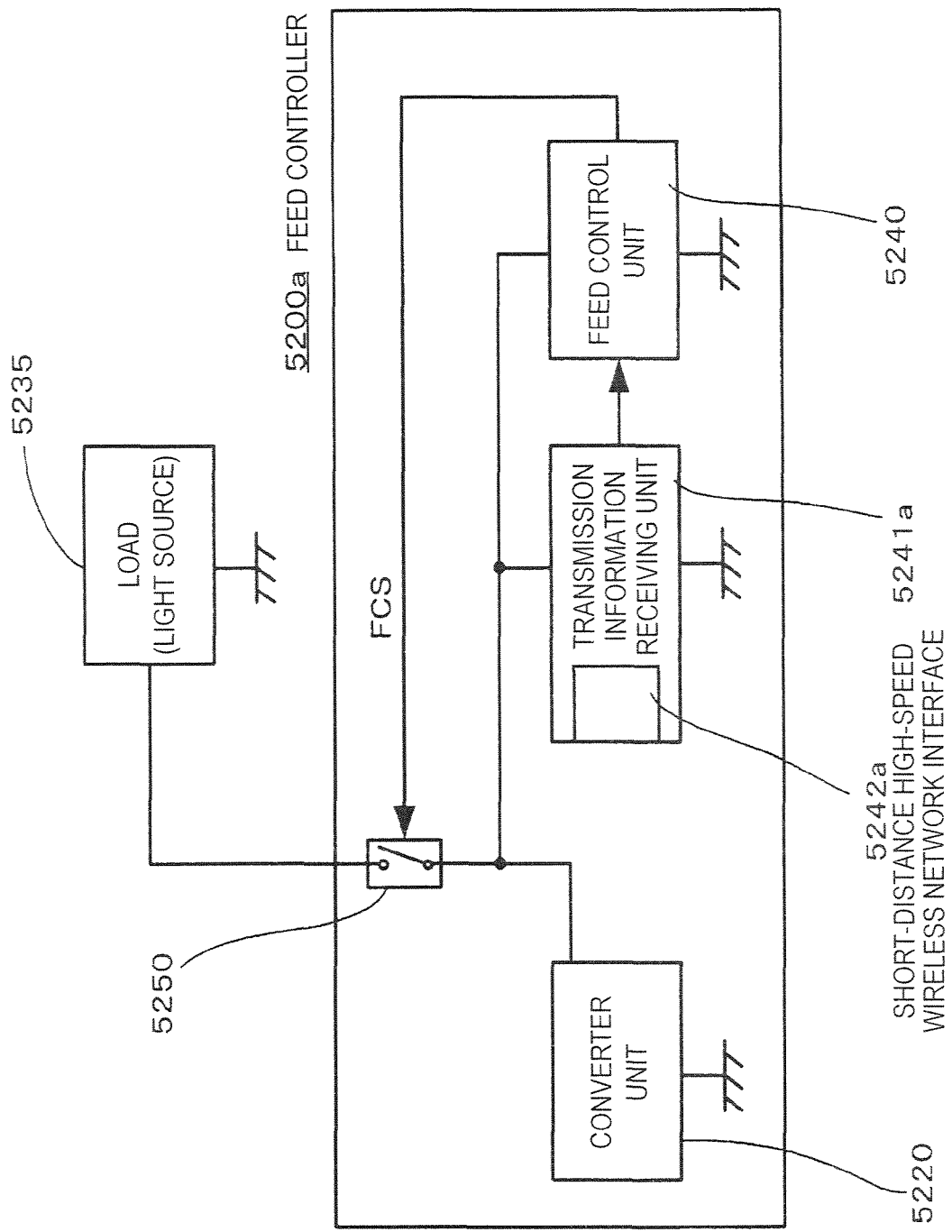
FIG. 13 is a circuit diagram showing another example of the feed controller shown in FIG. 10.

FIGS. 12 and 13 are circuit diagrams showing structure examples of the feed controller 5200 described with reference to FIG. 10.

The feed controller 5200 shown in FIG. 12 includes a converter unit 5220, a transmission information receiving unit 5241 having an antenna circuit 5242 for receiving the transmission information, a feed control unit 5240 for generating the feed control signal FCS according to the transmission information received by the transmission information receiving unit 5241 and controlling power supply to a light source such that illumination light can be modulated, and a switch unit 5230 inserted into a feed path 5221 between the converter unit 5220 and a light source 5235 as a load to connect or disconnect power supply according to the feed control signal FCS outputted from the feed control unit 5240.

On the other hand, a feed controller 5200*a* shown in FIG. 13 includes the converter unit 5220, a transmission information receiving unit 5241*a*, the feed control unit 5240, and the switch unit 5230 inserted into the feed path 5221 as a structure approximately similar to that of the feed controller 5200 shown in FIG. 12.

In this structure, connection and disconnection of power supply to the light source 3235 as the load is achieved by opening and closing the switch unit 5230 similarly to the example shown in FIG. 12. However, the feed controller 5200*a* shown in FIG. 13 is particularly characterized in that the transmission information receiving unit 5241*a* has a short-distance high-speed wireless network interface 5242*a* like bluetooth interface.

Figure 28:
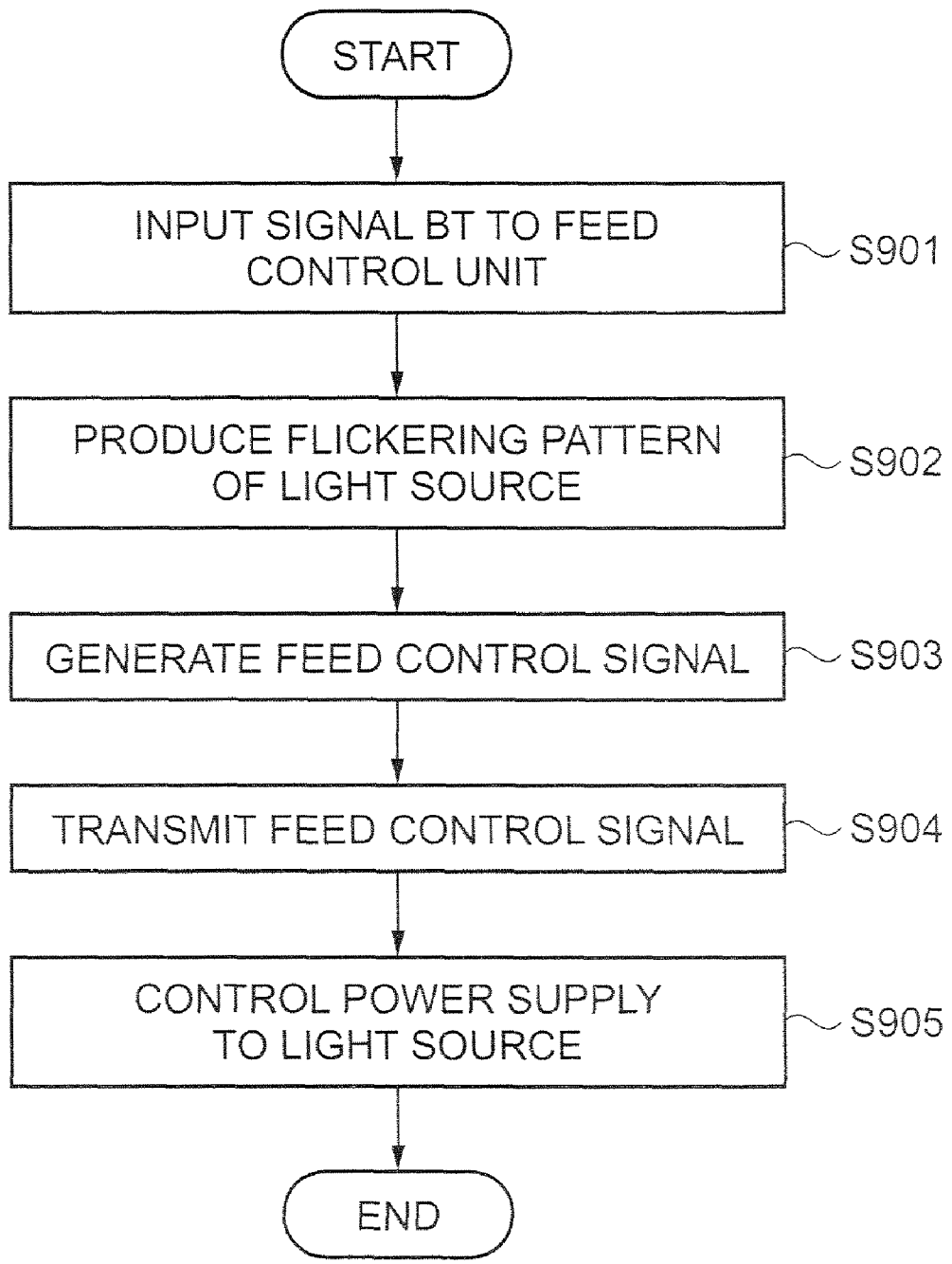
FIG. 28 is a flowchart showing process performed by a feed control unit of the feed controller shown in FIG. 13.

A use condition example of the flashlight 5000 shown in FIG. 10 including the feed controller 5200*a* shown in FIG. 13 is now described. FIG. 28 is a flowchart showing process performed by the feed control unit of the feed controller shown in FIG. 13.

The flashlight 5000 controls power supply to the light source by the function of the feed controller 5200*a* attached to the inside of the battery holder 5100 as the communication circuit module, and thus can provide illumination light communication by flickering or blinking of the illumination light in the manner conforming to the predetermined code system.

The transmission information in the illumination light communication is supplied from the portable information terminal 5500 to the feed controller 5200*a* within the main body 5001 of the flashlight 5000 while carried on the signal BT conforming to bluetooth as short-distance high-speed wireless communication, for example.

The user who transmits the transmission information supplies the transmission information on the bluetooth signal BT from the portable information terminal 5500 to the feed controller 5200*a* by key input operation or by other method.

In this case, the portable information terminal 5500 encodes the transmission information inputted by the user to generate the signal BT based on the encoded information. Then, the portable information terminal 5500 transmits the generated signal BT to the feed controller 5200*a*.

The feed controller 5200*a* receives the signal BT transmitted from the portable information terminal 5500 via the transmission information receiving unit 5241*a*. In this case, the transmission information receiving unit 241*a* receives the signal BT transmitted from the portable information terminal 5500 through the short-distance high-speed wireless network interface 5242*a*.

Then, the feed controller 5200*a* of the flashlight 5000 having received the signal BT from the portable information terminal 5500 executes illumination light control process shown in FIG. 28.

When the transmission information receiving unit 5241*a* of the feed controller 5200*a* receives the signal BT, the process initially goes to step S901.

In step S901, the transmission information receiving unit 5241*a* inputs the received signal BT to the feed control unit 5240. Then, the process proceeds to step S902.

In step 902, the feed control unit 5240 generates flickering pattern of the light source based on the inputted signal BT, and the process shifts to step 5903. In this case, the flickering pattern of the light source is produced according to predetermined protocol.

In step S903, the feed control unit 5240 generates the feed control signal FCS based on the produced flickering pattern, and the process goes to step S904.

In step S904, the feed control unit 5240 transmits the generated feed control signal FCS to the switch unit 5230, and the process shifts to step S905.

In step S905, the switch unit 5230 controls power supply to the light source 5235 according to the feed control signal FCS, and then the illumination light control process ends.

By the illumination control process, the illumination light modulated according to the transmission information is projected from the light emission surface 5004 of the flashlight 5000 on the transmission side of the optical communication toward the portable information terminal 5600 on the receiving side of the optical communication.

The portable information terminal 5600 receives the illumination light projected from the flashlight 5000 via the camera 5601. In this case, the portable information terminal 5600 captures the illumination light from the flashlight 5000 as a dynamic image by the camera 5601 within its image pickup visual field SV.

Then, the portable information terminal 5600 having received the illumination light from the flashlight 5000 demodulates the transmission information from the illumination signal captured as the dynamic image by a known illumination light signal decoding function. In this case, the portable information terminal 5600 demodulates the transmission information from the illumination signal based on the predetermined protocol discussed above.

Then, the portable information terminal 5600 displays the demodulated transmission information on the display unit or the like. Thus, the user of the portable information terminal 5600 can check the transmission information.

Accordingly, the flashlight 5000 having the feed controller 5200*a* can provide illumination light communication by modulating illumination light projected from the flashlight 5000 as the lighting device providing a far longer light emission distance than that of light from the display unit of the portable information terminal according to the transmission information.

The feed controller 5200*a* may have a structure which stores ID information for identifying the feed controller 5200*a* in the feed control unit 5240.

In this case, the transmission information in the illumination light communication corresponds to information inputted from the portable information terminal 5500 and ID information. The feed controller 5200*a* transmits information inputted from the portable information terminal 5500 as the transmission information and ID information to the portable information terminal 5600 on the receiving side of the optical communication by utilizing illumination light.

That is, the feed controller 5200*a* produces the flickering pattern of the light source for the transmission of the inputted signal BT and the ID information stored in the feed control unit 5240 in the illumination light control process performed at the time of reception of the signal BT by the transmission information receiving unit 5241*a*. In this case, the flickering pattern of the light source is produced according to the predetermined protocol discussed above. Then, the feed controller 5200*a* generates the feed control signal FCS based on the produced flickering pattern, and controls power supply to the light source 5235 according to the generated feed control signal FCS.

Thus, the portable information terminal 5600 on the receiving side of the optical communication can manage the information inputted from the portable information terminal 5500 based on the ID information. When the plural flashlights 5000 to each of which the feed controller 5200*a* is attached are used, for example, the portable information terminal 5600 on the receiving side of the optical communication can manage the information transmitted from each of the flashlights 5000 (information inputted from the portable information terminal 5500) based on the ID information.

Figure 14:
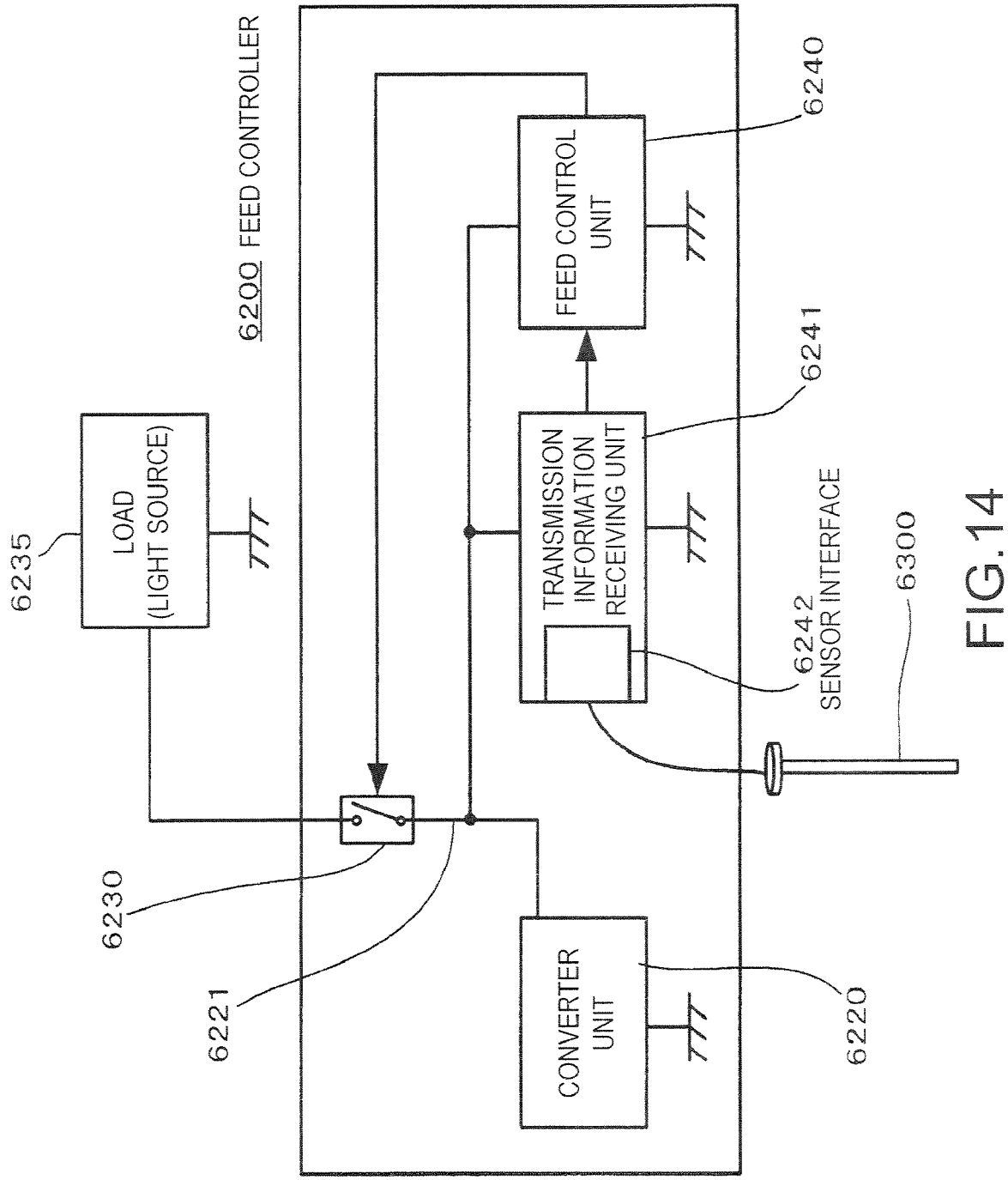
FIG. 14 is a circuit diagram showing an example of the feed controller shown in FIG. 11.

FIG. 14 is a circuit diagram showing a structure example of the feed controller 6200 described with reference to FIG. 11.

As shown in FIG. 14, the feed controller 6200 includes a converter unit 6220, a transmission information receiving unit 6242 for receiving the transmission information, a feed control unit 6240 for generating the feed control signal FCS according to the transmission information received by the transmission information receiving unit 6241 and controlling power supply to a light source such that illumination light can be modulated, and a switch unit 6230 inserted into a feed path 6221 between the converter unit 6220 and a light source 6235 as a load to connect or disconnect power supply according to the feed control signal FCS outputted from the feed control unit 6240.

According to this structure, particularly the transmission information receiving unit 6241 shown in FIG. 14 is characterized by including a sensor interface 6242 which receives information from a sensor for detecting the amount indicating predetermined material phenomenon condition such as temperature, pressure, and flow amount.

More specifically, the sensor interface 6242 as a sensor receives detection value of water temperature (resistance value corresponding to water temperature) detected from a resistance thermometer bulb 6300 as a temperature sensor according to the application example shown in FIG. 11.

Thus, when the feed controller 6200 shown in FIG. 14 is used, transmission of data indicating the amount of predetermined material phenomenon condition such as temperature, pressure, and flow amount is achieved by optical communication utilizing illumination light.

Figure 29:
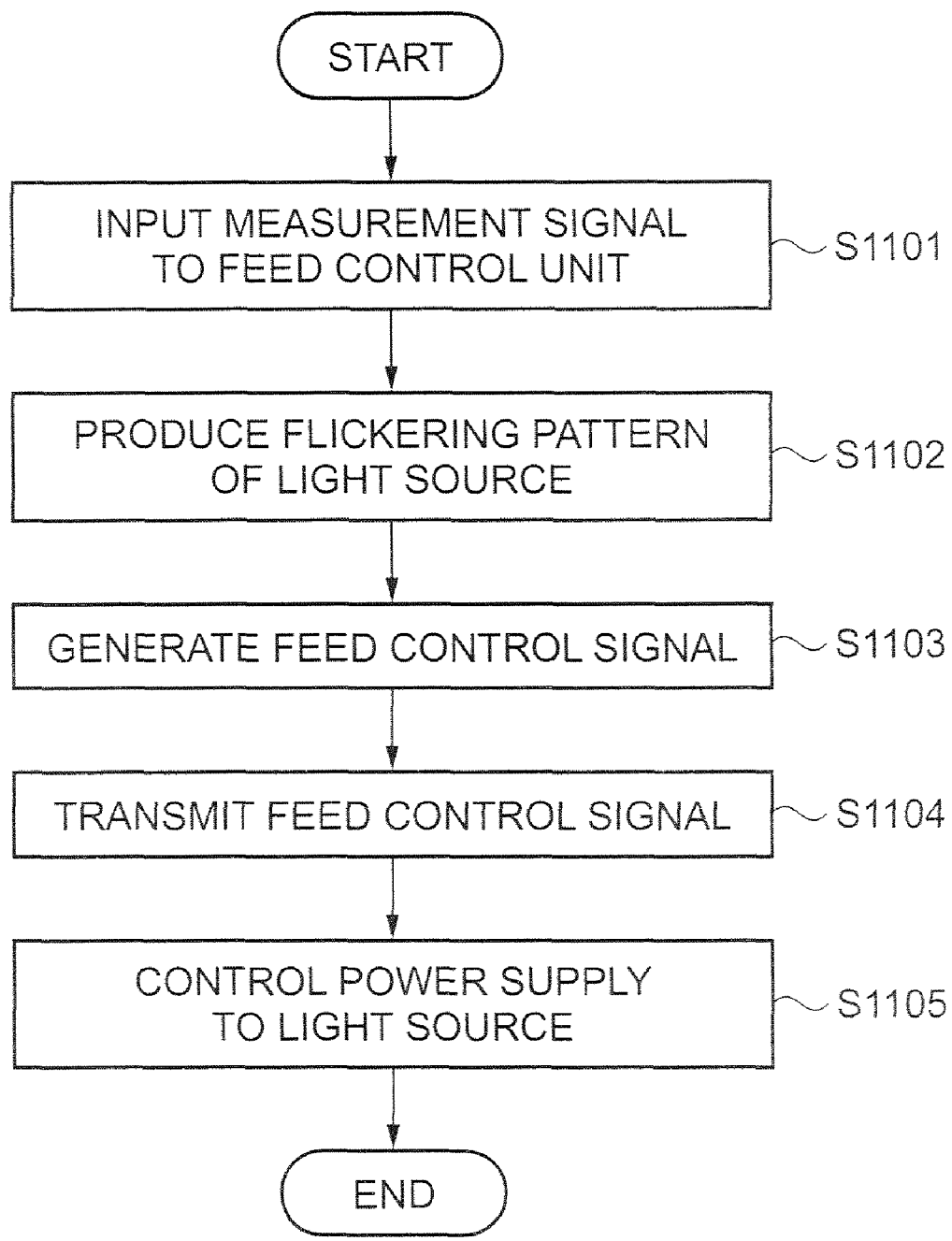
FIG. 29 is a flowchart showing process performed by a feed control unit of the feed controller shown in FIG. 14.

A use condition example of the LED type lantern 6000 shown in FIG. 11 which includes the feed controller 6200 shown in FIG. 14 is now described. FIG. 29 is a flowchart showing process performed by the feed control unit of the feed controller shown in FIG. 14.

The LED type lantern 6000 controls power supply to the light source by the function of the feed controller 6200 attached to the inside of the battery holder 6100 as the communication circuit module, and provides illumination light communication by flickering or blinking of the illumination light in the manner conforming to predetermined code system.

The transmission information in the illumination light communication is water temperature data of the water tank 6400 detected by the resistance thermometer bulb 6300 as the temperature sensor. The resistance thermometer bulb 6300 transmits the detected water temperature of the water tank 6400 on an electric signal (hereinafter referred to as measurement signal) to the feed controller 6200.

The feed controller 6200 receives the measurement signal transmitted from the resistance thermometer bulb 6300 via the transmission information receiving unit 6241. In this case, the transmission information receiving unit 6241 receives the measurement signal transmitted from the resistance thermometer bulb 6300 through the sensor interface 6242.

Then, the feed controller 6200 of the LED type lantern 6000 having received the measurement signal transmitted from the resistance thermometer bulb 6300 executes illumination light control process shown in FIG. 29.

When the transmission information receiving unit 6241 of the feed controller 6200 receives the measurement signal, the process initially goes to step S1101.

In step S1101, the transmission information receiving unit 6241 inputs the received measurement signal to the feed control unit 6240. Then, the process proceeds to step S1102.

In step 1102, the feed control unit 6240 produces flickering pattern of the light source based on the inputted measurement signal, and the process shifts to step S1103. In this case, the flickering pattern of the light source is produced according to predetermined protocol.

In step S1103, the feed control unit 6240 generates the feed control signal FCS based on the produced flickering pattern, and the process goes to step S1104.

In step S1104, the feed control unit 6240 transmits the generated feed control signal FCS to the switch unit 6230, and the process shifts to step S1105.

In step S1105, the switch unit 6230 controls power supply to the light source 5235 according to the feed control signal FCS, and then the illumination light control process ends.

By the illumination control process, the illumination light modulated according to the water temperature data as the transmission information is projected from the light source 6005 of the LED type lantern 6000 on the transmission side of the optical communication toward the portable information terminal 6600 on the receiving side of the optical communication.

The portable information terminal 6600 receives the illumination light projected from the LED type lantern 6000 via the camera 6601. In this case, the portable information terminal 6600 captures the illumination light from the LED type lantern 6000 (light source 6005) as a dynamic image by the camera 6601 within its image pickup visual field SV.

Then, the portable information terminal 6600 having received the illumination light from the LED type lantern 6000 demodulates the transmission information from the illumination signal captured as the dynamic image by a known illumination light signal decoding function. In this case, the portable information terminal 6600 demodulates the transmission information from the illumination signal based on the predetermined protocol discussed above.

Then, the portable information terminal 6600 displays the demodulated transmission information on the display unit or the like. Thus, the user of the portable information terminal 6600 can check the water temperature data as the transmission information.

Accordingly, the LED type lantern 6000 having the feed controller 6200 can provide illumination light communication by modulating illumination light projected from the LED type lantern 6000 as the lighting device providing a far longer light emission distance than that of light from the display unit of the portable information terminal according to the transmission information.

The feed controller 6200 may have a structure which stores ID information for identifying the feed controller 6200 in the feed control unit 6240.

In this case, the transmission information in the illumination light communication corresponds to water temperature data of the water tank 6400 detected by the resistance thermometer bulb 6300 as the temperature sensor and ID information. The feed controller 6200 transmits the water temperature data as the transmission information and ID information to the portable information terminal 6600 on the receiving side of the optical communication by utilizing illumination light.

That is, the feed controller 6200 produces the flickering pattern of the light source for the transmission of the inputted measurement signal and the ID information stored in the feed control unit 6240 in the illumination light control process performed at the time of reception of the measurement signal by the transmission information receiving unit 6241. In this case, the flickering pattern of the light source is produced according to the predetermined protocols discussed above. Then, the feed controller 6200 generates the feed control signal FCS based on the produced flickering pattern, and controls power supply to the light source 6235 according to the generated feed control signal FCS.

Thus, the portable information terminal 6600 on the receiving side of the optical communication can manage the water temperature data based on the ID information. When the plural LED type lanterns 6000 to each of which the feed controller 6200 is attached are provided at plural water temperature measuring points of a pond, for example, the portable information terminal 6600 on the receiving side of the optical communication can manage the water temperature data transmitted from each of the LED type lanterns 6000 based on the ID information. That is, water temperature data at each of the plural water temperature measuring points can be managed by the one portable information terminal 6600.

The feed controller 6200 may have a structure which includes a position detection sensor for detecting the position of the feed controller 6200. In this case, the position detection sensor is constituted by a GPS sensor, gyro sensor, or other sensors.

In this case, the transmission information in the illumination light communication is water temperature data of the water tank 6400 detected by the resistance thermometer bulb 6300 as the temperature sensor and position information of the LED type lantern 6000 to which the feed controller 6200 is attached detected by the position detection sensor. The feed controller 6200 transmits the water temperature data and the position information as the transmission information to the portable information terminal 6600 on the receiving side of the optical communication by utilizing illumination light.

More specifically, the feed controller 6200 produces flickering patter of the light source for transmission of the inputted measurement signal and the position information detected by the position detection sensor in the illumination light control process executed when the transmission information receiving unit 6241 receives the measurement signal. In this case, the flickering pattern of the light source is produced according to the predetermined protocol. Then, the feed controller 6200 generates the feed control signal FCS based on the produced flickering pattern, and controls power supply to the light source 6235 according to the generated feed control signal FCS.

By this method, the portable information terminal 6600 on the receiving side of the optical communication can manage the water temperature data according to the position information. When the water temperatures at the plural positions of the pond are measured by one LED type lantern 6000, for example, the water temperature data at each measurement position can be managed based on the position information.

Figure 15:
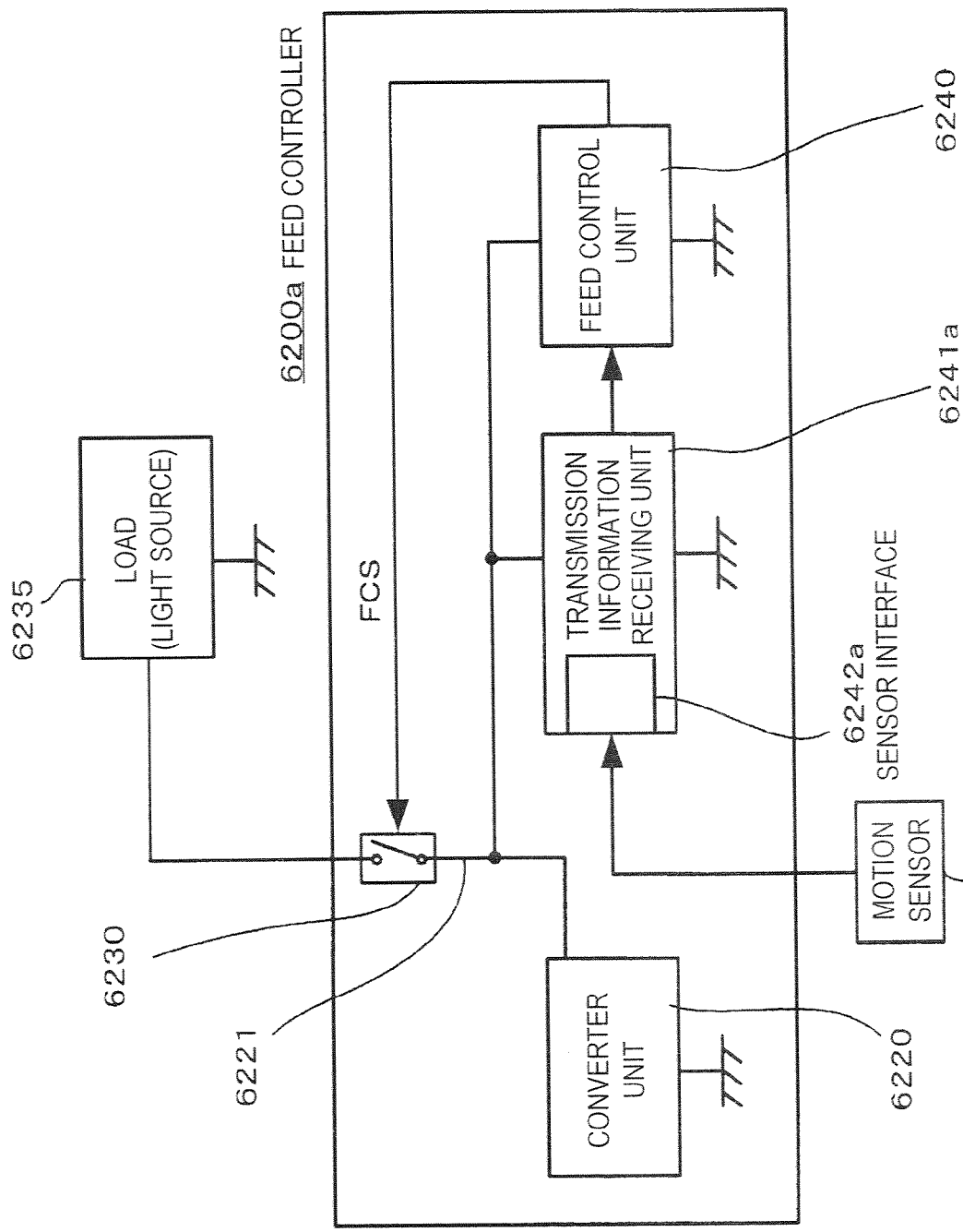
FIG. 15 is a circuit diagram showing another example of the feed controller.

FIG. 15 is a circuit diagram showing a feed controller in a further example.

In FIG. 15, similar reference numbers are given to parts corresponding to those described above and shown in FIG. 14, and the same explanation of each part is not repeated.

Similarly to the feed controller 6200 shown in FIG. 14, a feed controller 6200a includes the converter unit 6220, a transmission information receiving unit 6241a, the feed control unit 6240, and the switch unit 6230 inserted into the feed path 6221 connected to the light source 6235 as a load.

When the feed controller 6200a is attached to the battery holder 5100 of the flashlight 5000 shown in FIG. 10 in place of the feed controller 5200 described above, optical communication is achieved by connection and disconnection of power supply to the light source of the flashlight 5000 shown in FIG. 10 in accordance with opening and closing of the switch unit 6230 similarly to the example shown in FIG. 12.

However, the transmission information receiving unit 6241a is particularly characterized by including a sensor interface 6242a which receives information obtained by a motion sensor 6350 such as a gyro sensor according to the example shown FIG. 15.

A detection value indicating the motion of an object such as the flashlight 5000 itself as the lighting device containing the feed controller 6200a) obtained by the motion sensor is inputted to the sensor interface 6242a through the sensor interface as transmission information.

Thus, the user who transmits information allows the transmission information receiving unit 6241a to recognize particular transmission information by shaking the flashlight 5000 along a fixed track in the air according to particular rules, for example, such that light from the light source can flicker by the operation of the feed controller 6200a according to the recognized information without requiring additional device such as PDA. Accordingly, transmission of information can be achieved by illumination light communication utilizing flickering of the light.

For example, methods such as shaking in the predetermined manner for turning on the light source and rotating the flashlight 5000 anticlockwise for transmitting light signal showing data A can be employed.

Figure 30:
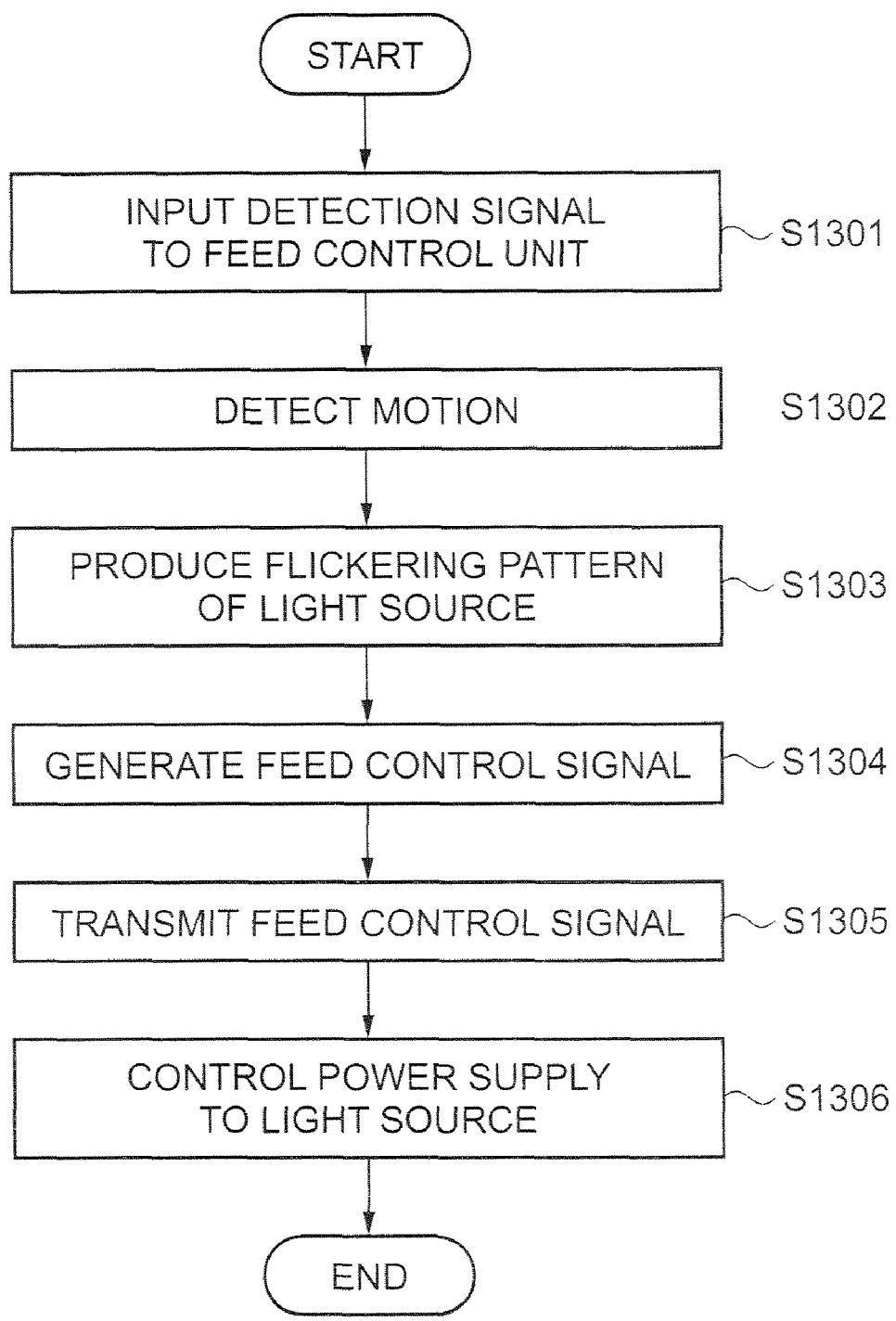
FIG. 30 is a flowchart showing process performed by a feed control unit of the feed controller shown in FIG. 15.

A use condition example of the flashlight 5000 shown in FIG. 10 including the feed controller 6200a shown in FIG. 15 is now described. FIG. 30 is a flowchart showing process performed by the feed control unit of the feed controller shown in FIG. 15.

The flashlight 5000 controls power supply to the light source by the function of the feed controller 6200a attached to the inside of the battery holder 5100 as the communication circuit module, and provides illumination light communication by flickering or blinking of the illumination light in the manner conforming to the predetermined code system.

The transmission information in the illumination light communication is information corresponding to the way of movement of the flashlight 5000 itself to which the feed controller 6200a is attached.

More specifically, the user of the flashlight 5000 inputs the transmission information to the feed controller 6200a by moving the flashlight 5000 in the predetermined manner. In this case, the relation between the way of movement of the flashlight 5000 and the corresponding transmission information is determined in advance. For example, transmission information is data A when the flashlight 5000 is rotated clockwise, and transmission information is data B when the flashlight 5000 is rotated anticlockwise.

The motion sensor 6350 transmits a detection value indicating the movement of the flashlight 5000 to which the feed controller 6200a is attached on an electric signal (hereinafter referred to as detection signal) to the feed controller 6200a.

The feed controller 6200a receives the detection signal transmitted from the motion sensor 6350 via the transmission information receiving unit 6241a. In this case, the transmission information receiving unit 6241a receives the detection signal transmitted from the motion sensor 6350 through the sensor interface 6242a.

Then, the feed controller 6200a of the flashlight 5000 having received the detection signal transmitted from the motion sensor 6350 executes illumination light control process shown in FIG. 30.

When the transmission information receiving unit 6241a of the feed controller 6200a receives the detection signal, the process initially goes to step S1301.

In step S1301, the transmission information receiving unit 6241a inputs the received detection signal to the feed control unit 6240. Then, the process proceeds to step S1302.

In step 1302, the feed control unit 6240 detects the movement of the flashlight 5000 based on the inputted detection signal, and the process shifts to step S1303. In this case, the movement of the flashlight 5000 is detected based on the change of the inputted detection signal according to predetermined protocol.

An step S1303, the feed control unit 6240 produces flickering pattern of the light source based on the detected movement of the flashlight 5000, and the process goes to step S1304. In this case, the feed control unit 6240 produces the flickering pattern of the light source based on the command table showing the relation between the movement of the flashlight 5000 and the flickering pattern of the light source.

In step S1304, the feed control unit 6240 generates the feed control signal FCS based on the produced flickering pattern, and the process shifts to step S1305.

In step S1305, the feed control unit 6240 transmits the generated feed control signal FCS to the switch unit 6230, and then the process goes to step S1306.

In step S1306, the switch unit 6230 controls power supply to the light source 6235 according to the feed control signal FCS, and then the illumination light control process ends.

By the illumination control process, the illumination light modulated according to the transmission information is projected from the light source 5004 of the flashlight 5000 on the transmission side of the optical communication toward the portable information terminal 5600 on the receiving side of the optical communication.

The portable information terminal 5600 receives the illumination light projected from the flashlight 5000 via the camera 5601. In this case, the portable information terminal 5600 captures the illumination light from the flashlight 5000 as a dynamic image by the camera 5601 within its image pickup visual field SV.

Then, the portable information terminal 5600 having received the illumination light from the flashlight 5000 demodulates the transmission information from the illumination signal captured as the dynamic image by a known illumination light signal decoding function. In this case, the portable information terminal 5600 demodulates the transmission information from the illumination signal based on the predetermined protocol discussed above.

Then, the portable information terminal 5600 displays the demodulated transmission information on the display unit or the like. Thus, the user of the portable information terminal 5600 can check the transmission information.

Accordingly, the flashlight 5000 having the feed controller 6200a can provide illumination light communication by modulating illumination light projected from the flashlight 5000 as the lighting device providing a far longer light emission distance than that of light from the display unit of the portable information terminal according to the transmission information.

The feed controller 6200a may have a structure which scores ID information for identifying the feed controller 6200a in the feed control unit 6240.

In this case, the transmission information in the illumination light communication is information corresponding to the movement of the flashlight 5000 itself and the ID information. The feed controller 6200a transmits the information corresponding to the movement of the flashlight 5000 as the transmission information and the ID information to the portable information terminal 5600 on the receiving side by utilizing illumination light.

More specifically, the feed controller 6200a produces the flickering pattern of the light source for transmission of the information corresponding to the inputted detection signal and the ID information stored in the feed control unit 5240 in the illumination control process executed when the transmission information receiving unit 6241a receives the detection signal. Then, the feed controller 6200a generates the feed control signal FCS based on the produced flickering pattern and controls power supply to the light source 6235 according to the generated feed control signal FCS.

By this method, the portable information terminal 5600 on the receiving side of the optical communication can manage the information corresponding to the movement of the flashlight 5000 based on the ID information.

Figure 16:
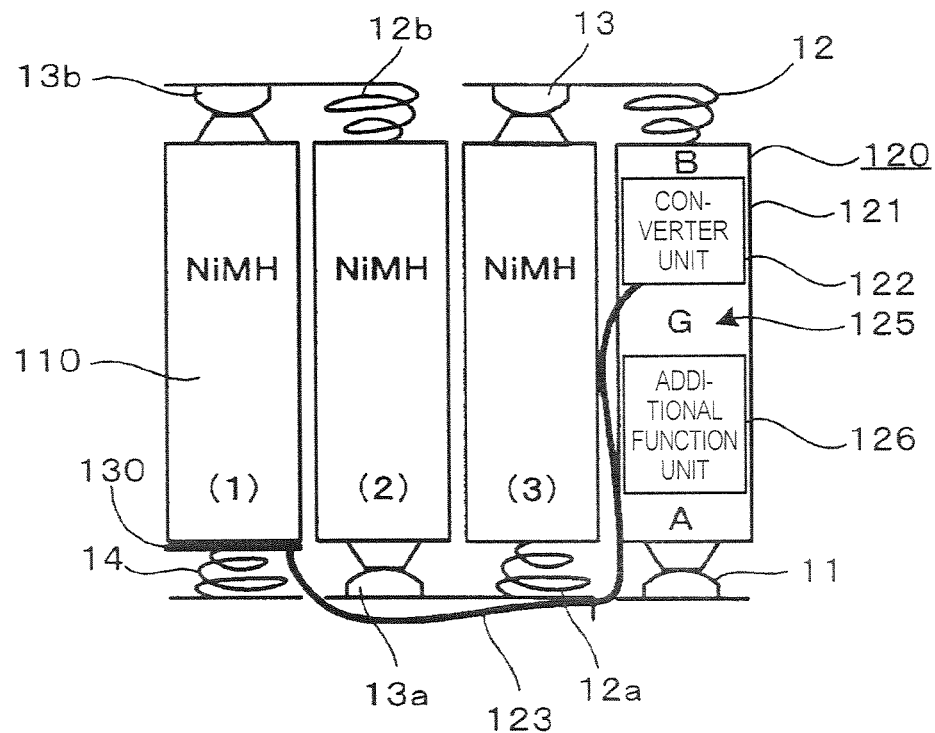
FIG. 16 illustrates a function as a power source circuit of the feed controller as an example of the invention.

FIG. 16 illustrates the function of the feed controller as the power source circuit according to an example of the invention.

FIG. 16 shows a condition of a feed controller 120 as an example of the invention attached to a battery holder so designed as to contain four batteries side by side like the LED type flashlight 5000 shown in FIG. 10 and the LED type lantern 6000 shown in FIG. 11.

The battery holder is a known type of battery holder. Thus, only contacts of the battery holder are shown in the figure and other parts of the structure body are eliminated. The battery holder is a type which connects batteries in series as in the case of an ordinary battery holder, and has a first contact 11 as an output pin on the positive electrode, a second contact 12, a fourth contact 12a, and a sixth contact 12b on the negative electrode connected with the negative electrode and the positive electrode of the adjoining batteries for connecting those electrodes, a third contact 13, a fifth contact 13a, and a seventh contact 13b on the positive electrode, and an eighth contact 14 as an output pin on the negative electrode.

In this example, three normal nickel hydrogen charging batteries (shown as "NiMH") 110 are connected and attached in series between the third contact 13 and the eight contact 14. Also, the feed controller 120 as an example of the invention is attached between the first contact 11 and the second contact 12.

In FIG. 16, the feed control unit and the switch unit discussed above other than the converter unit 122 are collectively shown as an additional function unit in the feed controller 120.

More specifically, the converter unit 122 which receives voltage corresponding to electromotive force of the batteries (the sum of electromotive forces from three real batteries) and converts the supplied voltage into output voltage corresponding to rated electromotive force within the outer casing 121 of the feed controller 120.

Also, the additional function unit 126 containing the feed control unit and the switch unit described above is mounted on another part of a mounting space 125 within the outer casing 121 as well as the converter unit 122 mounted on a part of the mounting space 125 as illustrated in the figure.

The indications "A", "B" and "G" in FIG. 16 in the associated figures in the following description are given for easy input and output correspondence between equivalent circuits.

Figure 17:
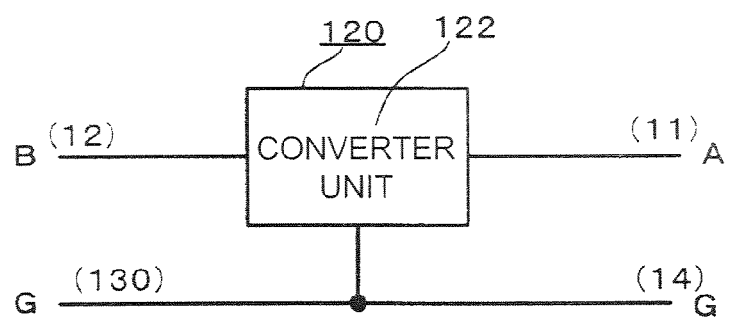
FIG. 17 illustrates an equivalent circuit showing the relation between input and output of the feed controller shown in FIG. 16.

FIG. 17 illustrates an equivalent circuit of the feed controller 120 shown in FIG. 16 illustrating the input and output relation. It is assumed herein that the feed control unit and the switch of the switch unit collectively referred to as the additional function unit 126 are kept ON condition in the equivalent circuit, and thus the additional function unit 126 is represented only by a single lead.

As can be seen from FIGS. 16 and 17, the negative electrode B has the same potential as that of the positive electrode of the nickel hydrogen charging battery 110 when one output end (positive electrode) and the other output end (negative electrode) of the feed controller 120 are A and B. respectively.

For supplying the operation power source to the converter unit 122 within the feed controller 120, the positive electrode of the nickel hydrogen charging battery 110 contacts the input of the positive electrode of the converter unit 122 (that is, negative electrode B of feed controller 120) to apply electromotive force to the converter unit 122 from the nickel hydrogen charging battery 110. The input of the negative electrode of the converter unit 122 is connected with the negative electrode of the nickel hydrogen charging battery 110 (that is, the eighth contact 14 of the battery holder in FIG. 2) through a power supply lead 123.

Connection between the power supply lead 123 and the nickel hydrogen charging battery 110 can be securely made by a connection conductor member 130 provided to achieve electric contact with a predetermined contact of the battery holder at the end of the power supply lead 123 extended from the outer casing 120 to the outside.

As described above, the feed controller as an example of the invention is attached to the battery holder in place of one of four batteries connected in series according to the specification and attached to the battery holder.

As can be easily understood from above description, the feed controller according to an example of the invention can be attached to the battery holder in place of at least one of two, three, four, five or six (corresponding to the case shown in FIG. 1) batteries connected in series to the battery holder.

According to the feed controller applied to the battery holder containing two batteries connected in series, under the condition where 1.0V approximately equivalent to the end voltage of the nickel hydrogen charging battery 110 is supplied as the lower limit input voltage, the converter unit 122 is so constructed as to generate output voltage of approximately 3.0V as rated electromotive force generated when the same type of two nickel hydrogen charging batteries connected in series are used. According to the feed controller applied to the battery holder containing three batteries connected in series, under the condition where the electromotive of each battery drops to about 1.0V, the converter unit 122 is so constructed as to output 4.5V by receiving the electromotive force of 2.0V from the two batteries connected in series. Similarly, the converter unit 122 is so structured as to output 6.0V by receiving the electromotive force of 3.0V from the three batteries connected in series according to the type where four batteries are arranged in series, as to output 7.5V by receiving the electromotive force of 4.0V from the four batteries connected in series according to the type where five batteries are arranged in series, and so constructed as to output 9.0V by receiving the electromotive force of 3.0V from the five batteries connected in series according to the type where six batteries are arranged in series (corresponding to the case shown in FIG. 1).

When combined with the nickel hydrogen charging batteries as the real batteries, the feed controller provides the following advantages. One of the advantages is that the nickel hydrogen battery can be applied to an electronic device so constructed as to operate by alkali manganese batteries currently available. In this case, the feed controller can be repeatedly used by charging without leakage of liquid, and thus are desirable in view of nature protection.

Moreover, the capability of high-capacity (low voltage) nickel hydrogen batteries can be sufficiently utilized. More specifically, when the end voltage of the nickel hydrogen batteries is set at 1.1V as in the case of alkali manganese batteries currently available, only two thirds of the capacity of the new type high-capacity nickel hydrogen batteries is used. When the feed controller according to an example of the invention described above is applied, however, the effective end voltage can be set according to the same specification as that of 1.0V as the end voltage of the new type high-capacity nickel hydrogen battery. Thus, all the capacity can be used.

In recent years, performance of the nickel hydrogen battery has rapidly improved, and the battery capacity has increased from 1600 mAH to 2700 mAH in approximately five years (battery capacity of alkali manganese battery is approximately 800 mAH). Thus, when one nickel hydrogen battery and the feed controller according to an example of the invention are combined in an electronic device which uses two alkali manganese batteries connected in series, the usable period increases without battery charge (replacement).

While the advantages provided when the feed controller as an example of the invention is combined with the nickel hydrogen battery have been particularly emphasized, similar remarkable advantages can be offered when the feed controller is used in combination with a fuel cell instead of the nickel hydrogen battery.

Figure 18:
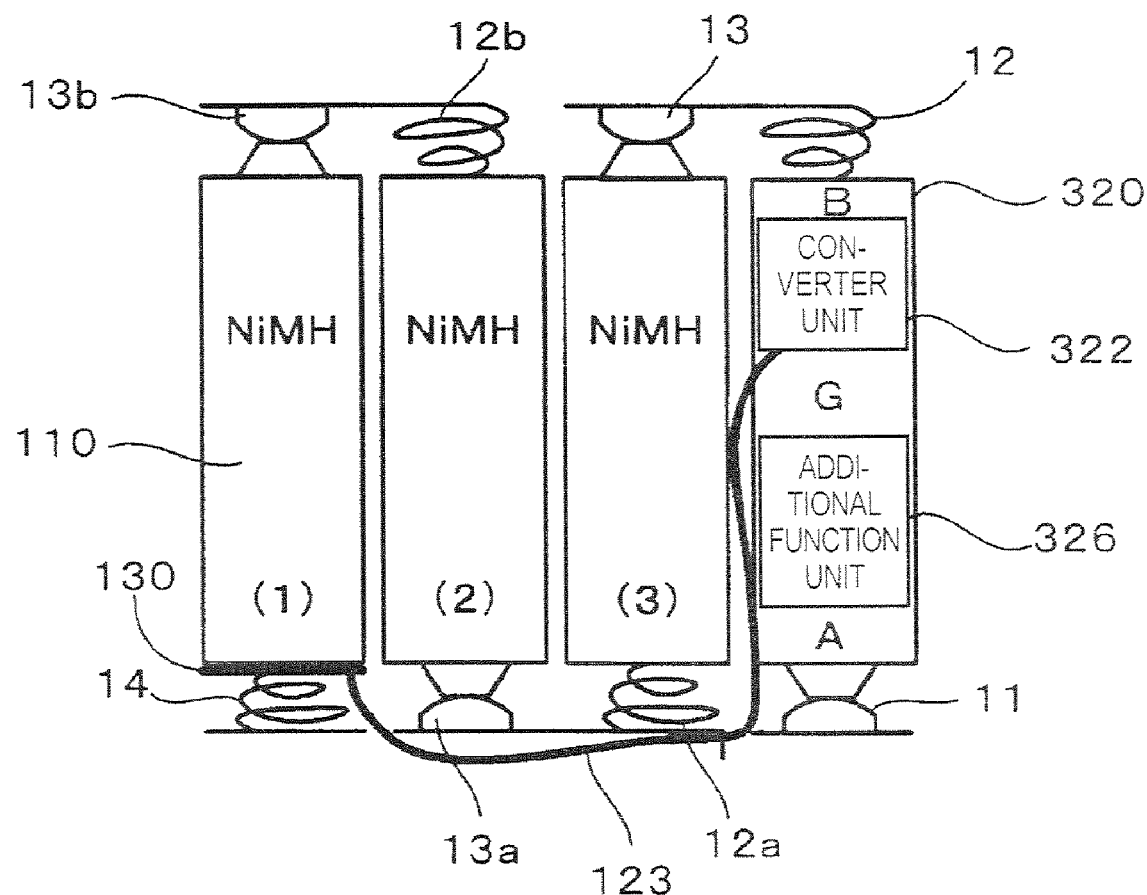
FIG. 18 illustrates a structure of a feed controller having charging mode switching function.

FIG. 18 illustrates a structure of a feed controller having charging mode switching function.

FIG. 18 shows a condition where a feed controller 320 in this example of the invention attached to a battery holder containing four batteries side by side as in the LED type flashlight 2000 shown in FIG. 4 and the LED type lantern 6000 shown in FIG. 11 as the lighting device.

An additional function unit 326 of the feed controller 320 shown in FIG. 18 contains a voltage detecting circuit and a converter control unit.

The voltage detecting circuit of the feed controller 320 constantly detects voltage supplied from the output end (positive electrode side) A from the feed controller 320.

Then, the converter control unit of the feed controller 320 judges whether the voltage detected by the voltage detecting circuit is equal to or higher than a predetermined threshold. When the voltage is equal to or higher than the predetermined threshold, the converter 322 is controlled in the charging mode. For example, the converter control unit of the feed controller 320 controls the converter unit 322 in the charging mode when the voltage detected by the voltage detecting circuit is a voltage corresponding to the rated electromotive force outputted from the positive electrode A of the converter unit 322 or higher.

The charging mode is a control mode for lowering charging voltage supplied from the positive electrode A of the feed controller 320 and supplying the lowered voltage from the negative electrode B to the real batteries 110, 110 and 110.

More specifically, under the condition where the feed controller 320 is attached to the battery holder of the battery drive type device having charging function of real batteries, charging voltage necessary for charging the rated number (four in the example in FIG. 18) of real batteries is supplied from the positive electrode A of the feed controller 320 when charging of the real batteries is initiated. Then, the feed controller 320 lowers the charging voltage supplied from the positive electrode A to a voltage necessary for charging the number (three in the example in FIG. 18) of the real batteries 110, 110 and 110 attached to the battery holder, and supplies the lowered charging voltage from the negative electrode B when detecting charging start of real batteries.

When the converter control unit of the feed controller 320 controls the converter unit 322 in the charging mode, output of voltage corresponding to the rated electromotive force of the converter unit 322 from the positive electrode A may be either stopped or continued.

Accordingly, the feed controller 320 included in the battery drive type device having real battery charging mechanism does not interrupt the charging function of real batteries.

Figure 19:
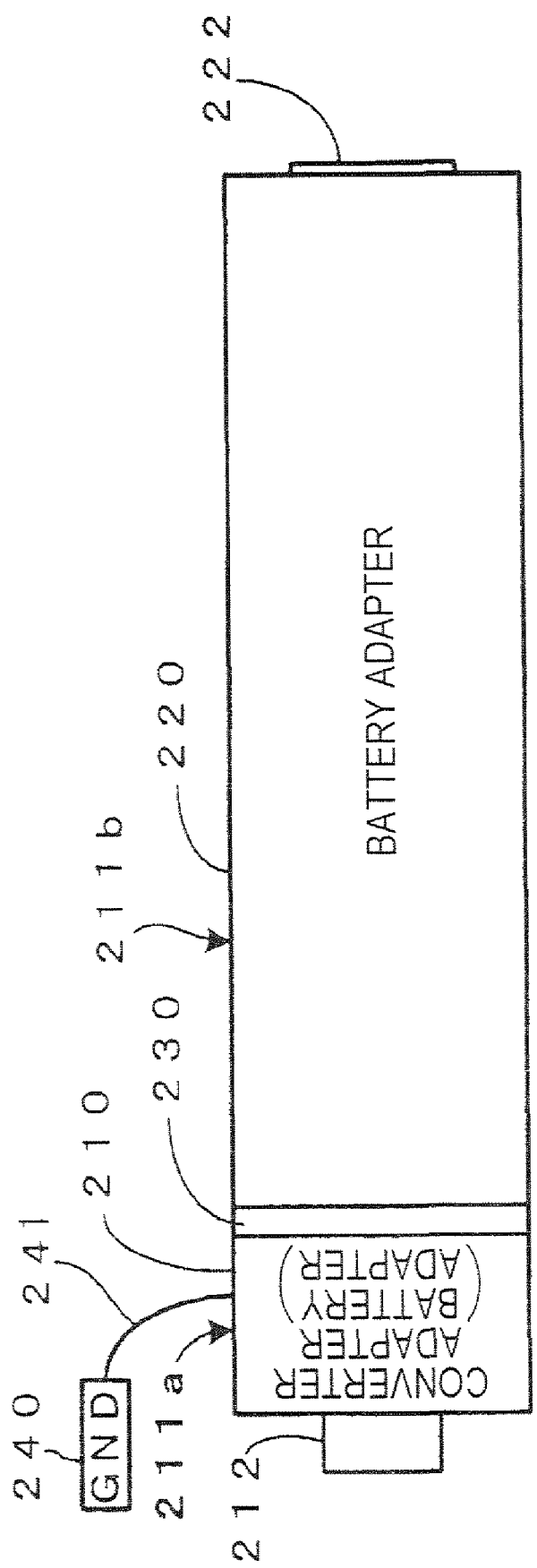
FIG. 19 illustrates an external appearance of a structure example of a feed controller as an example of the invention.

FIG. 19 illustrates external appearance of a mechanism or a feed controller as an example of the invention. This feed controller is a battery adapter supported by a battery holder so structured as to hold the plural rated number of predetermined batteries and obtain rated electromotive forces from the batteries connected in series, and used in place of one battery of the plural batteries. The entire shape and size of the adapter are the same as those of each real battery.

While the feed controller 120 shown in FIG. 16 has the converter unit and the additional function unit within the feed controller 120, the feed controller shown in FIG. 19 is different from the feed controller 120 and characterized in that a converter adapter containing a converter unit is a unit component having a relatively small outer casing so shaped and sized as to be held by the battery holder when combined with other predetermined structure.

As illustrated in FIG. 19, a converter adapter 210 containing a converter unit substantially similar to that shown in FIG. 16 inside an outer casing 211a, a predetermined constituent member as one battery adapter 220 containing an additional function unit which may be substantially similar to that shown in FIG. 16 within an outer casing 211b, and a joint adapter 230 detachably connecting both the converter adapter 210 and the battery adapter 220 such that the two adapters 210 and 220 can be joined to each other in a column at the position of a joint adapter 230.

A power source supply lead 241 as a grounding lead represented by "GND" as a concept connected with a contact conductor 240 provided to obtain electrical contact with predetermined contact of the battery holder extends from the converter adapter 210. A positive electrode contact 212 similar to a real battery is provided at the end of the positive electrode of the converter adapter 210.

Also, a negative electrode contact 222 similar to a real battery is provided at the end of the negative electrode of the electrode adapter 220 as another constituent member containing the additional function unit.

The joint adapter 230 has a conductor which detachably joins to the converter adapter 210 or the other battery adapter 220 to obtain desired electric contact by connecting with the converter adapter 210 or the other battery adapter 220, or with a predetermined conductor of the battery holder.

Figure 20:
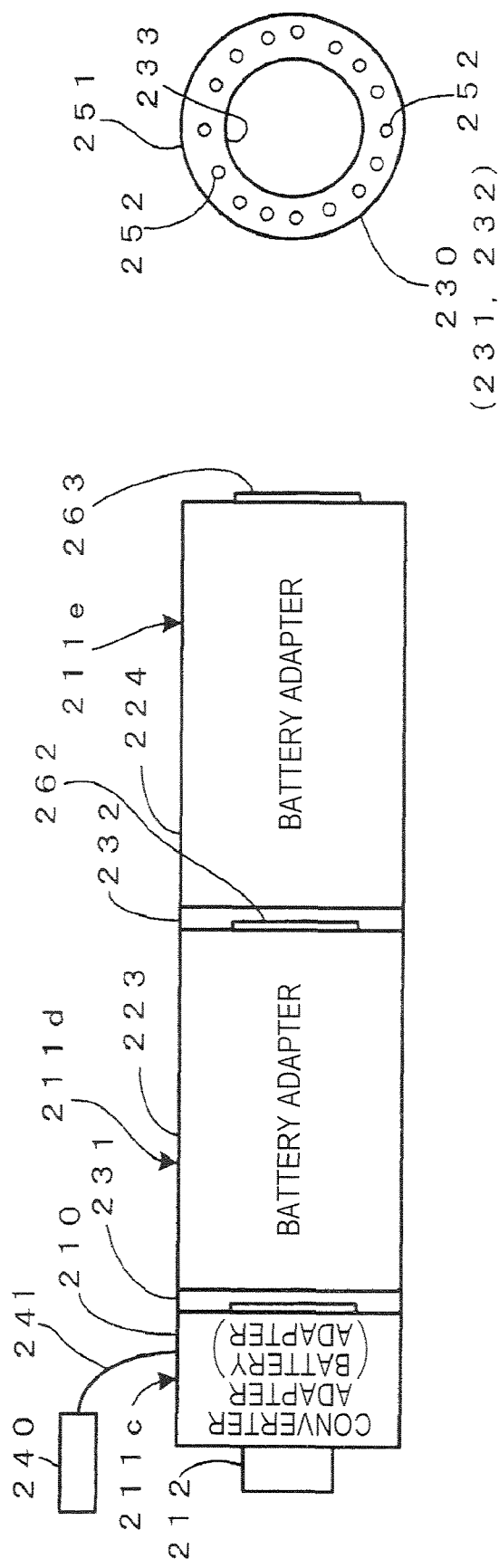
FIGS. 20A and 20B illustrate another structure example of the feed controller as an example of the invention.

FIGS. 20A and 20B show a mechanism of a feed controller in another example of the invention. FIG. 20A illustrates an external appearance of a feed controller including three battery adapters combined in a column. FIG. 20B is a plan view showing a joint adapter inserted into each connection of the battery adapters in a column shown in FIG. 20A.

Figure 21:
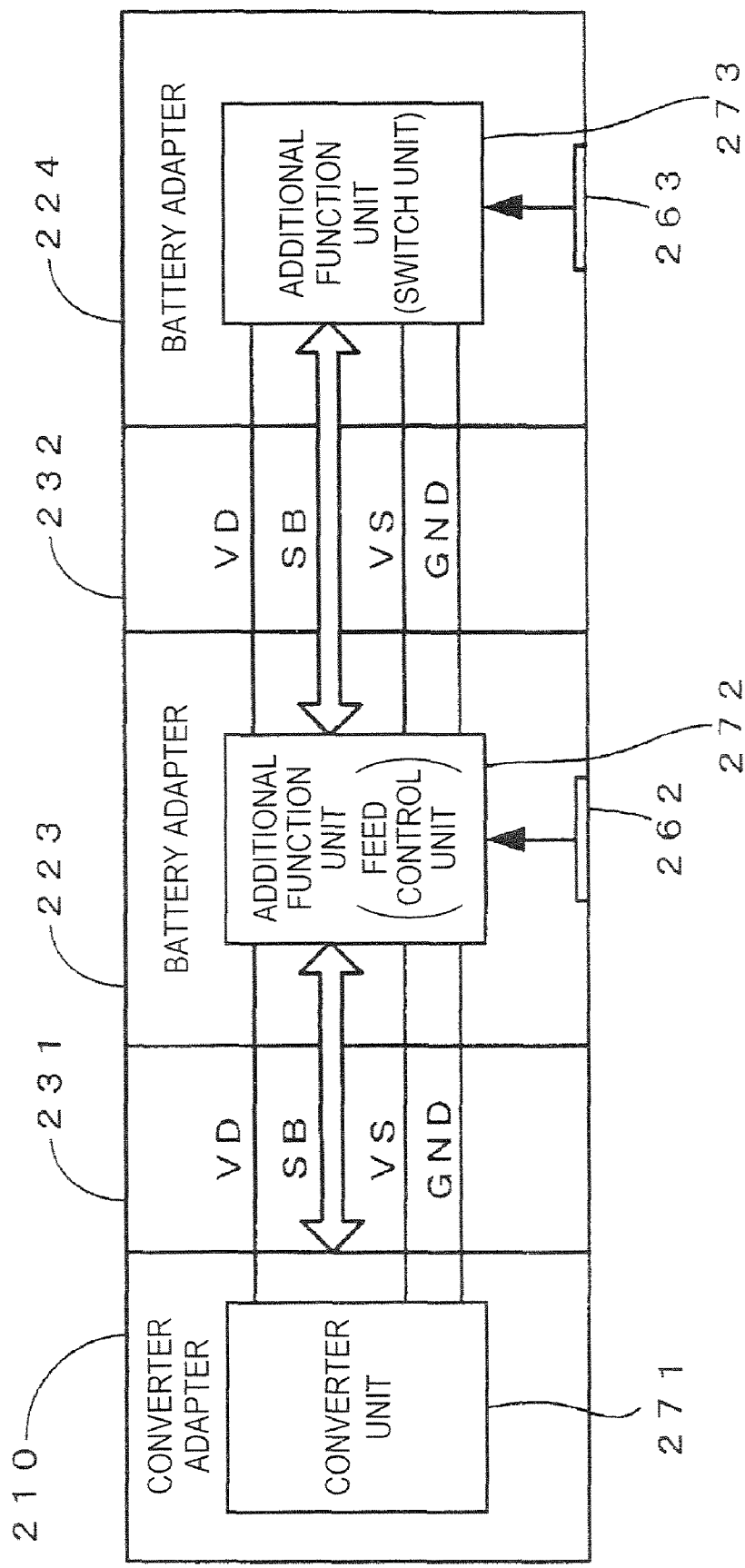
FIG. 21 shows connection relation between electric elements in the feed controller shown in FIGS. 20A and 20B.

FIG. 21 illustrates connection relation of electric elements included in the feed controller shown in FIGS. 20A and 203. In FIGS. 20A and 20E and FIG. 21, similar reference numbers are given to parts similar to those shown in FIG. 19.

As illustrated in FIG. 20A, the three battery adapters having outer casings 211c, 211d and 211e, respectively, to have shape and size corresponding to one real battery. As can be easily seen from FIGS. 20A and 20B as well as FIG. 21, the converter adapter 210 similar to that discussed above with reference to FIG. 19 is provided in the structure having the combined battery adapters at a position corresponding to the positive electrode of the real battery. Also, a battery adapter 223 having one additional function unit 272 corresponding to the feed control unit, for example, is connected at a position contacting the converter adapter 210 in a column via the joint adapter 231. Furthermore, a battery adapter 224 having another additional function unit 273 corresponding to the switch unit, for example, is connected at a position corresponding to the negative electrode of the real battery next to the feed controller 223 via the joint adapter 232.

As illustrated in FIG. 20A, the battery adapters 223 and 224 have negative electrode contacts 262 and 263, respectively, similar to the negative contact 222 in FIG. 19 and provided at the negative electrode ends of the feed controller.

Each of the joint adapters 231 and 232 is similar to a joint adapter 230 as a typical example shown in FIG. 20B, which is constituted by an annular structure member 251 as an insulator having a concave or through hole 233 which surrounds the projection portion of the negative electrode contact of the feed controller positioned at the center in the thickness direction.

A plurality of connection conductors 252, 252 are provided on the annular structure member 251 at predetermined intervals in the circumferential direction in such a condition as to penetrate through the structure member 251 in the thickness direction. These connection conductors 252, 252 are allocated as power source supply conductor to the primary side (input side) of the converter unit 271 of the converter adapter 210 (such as power source supply line for supplying 1.2V as electromotive force of real battery and indicated by a solid line VS in FIG. 21), power source supply conductor to the respective battery adapters 223 and 224 from the converter 271 (such as power source supply line for supplying 3.0V as boosting output from converter unit and indicated by a solid line VS in FIG. 16), a grounding conductor (indicated by a solid line GND in FIG. 16) and a plurality of conductors constituting serial bus for signal transmission (indicated by white arrows SB in FIG. 21) to secure necessary electric continuity at each point.

When the system has the structure containing the conductors for constituting this serial bus, one or plural parts of the additional function unit (such as feed control unit in case of the above examples) function as a system controller containing a microprocessor. In this case, high-performance and various functions can be added by connecting this system controller and other function unit via the serial bus. This technique is applicable to examples to be described later with reference to the associated figures.

In the structure having the three battery adapters combined in a column to have shape and size corresponding to one real battery as illustrated in FIG. 20A, power source (VS) is supplied to the converter adapter 210 via the connection conductors 252, 252 of the joint adapters 230 (231, 232) provided on the battery adapters 223 and 224, and the power source (VD) boosted by the converter adapter 210 is supplied to the additional function units 272 and 273 of the battery adapters 223 and 224.

In addition, signals are received and transmitted between the additional function units 272 and 273 of the battery adapters 223 and 224 through the conductors constituting the serial bus of the joint adapters 230 (231, 232).

Figure 22:
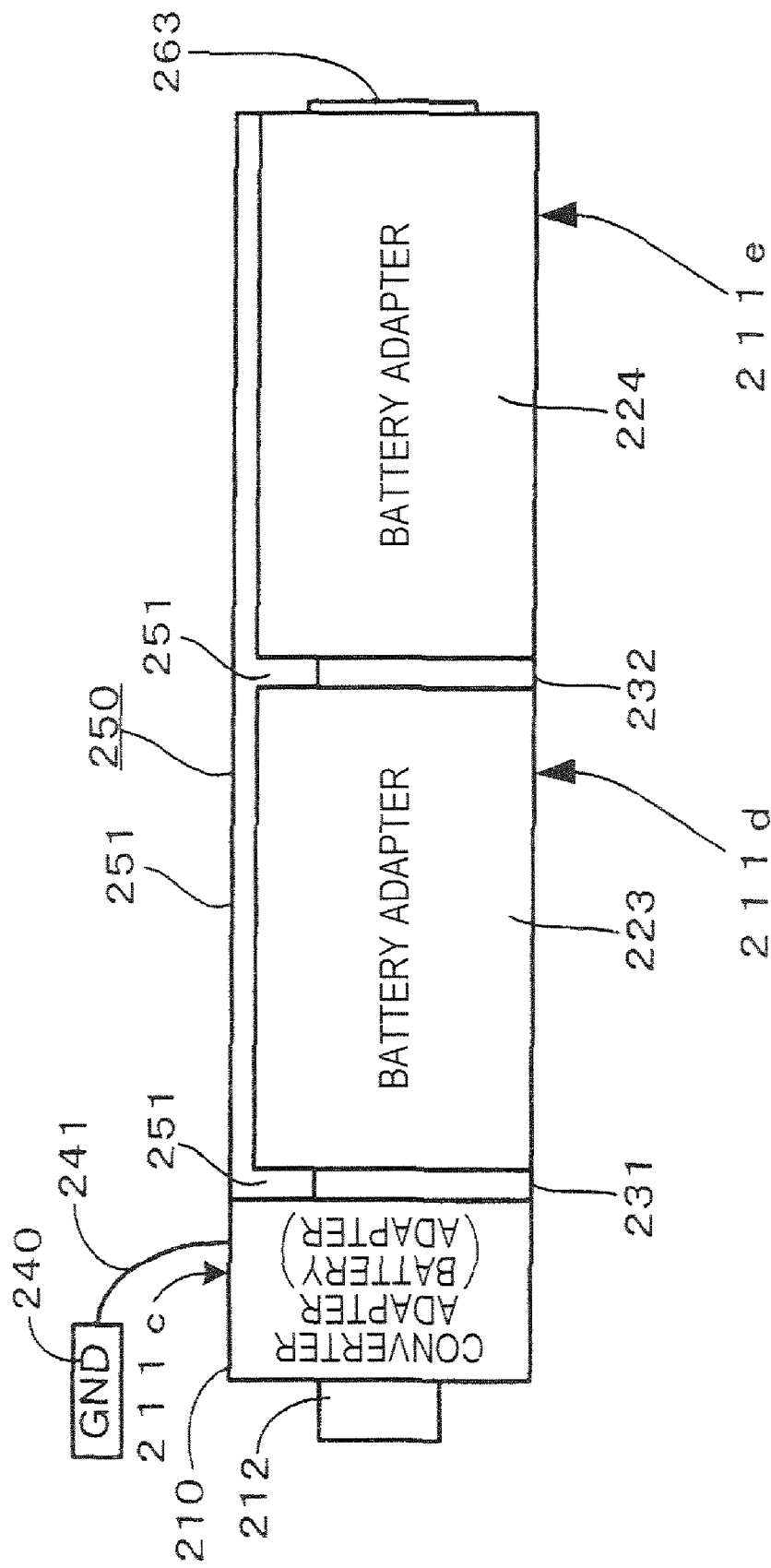
FIG. 22 illustrates a further structure example of the feed controller as an example of the invention.

FIG. 22 illustrates a mechanism of a feed controller in a further example of the invention.

Figure 23:
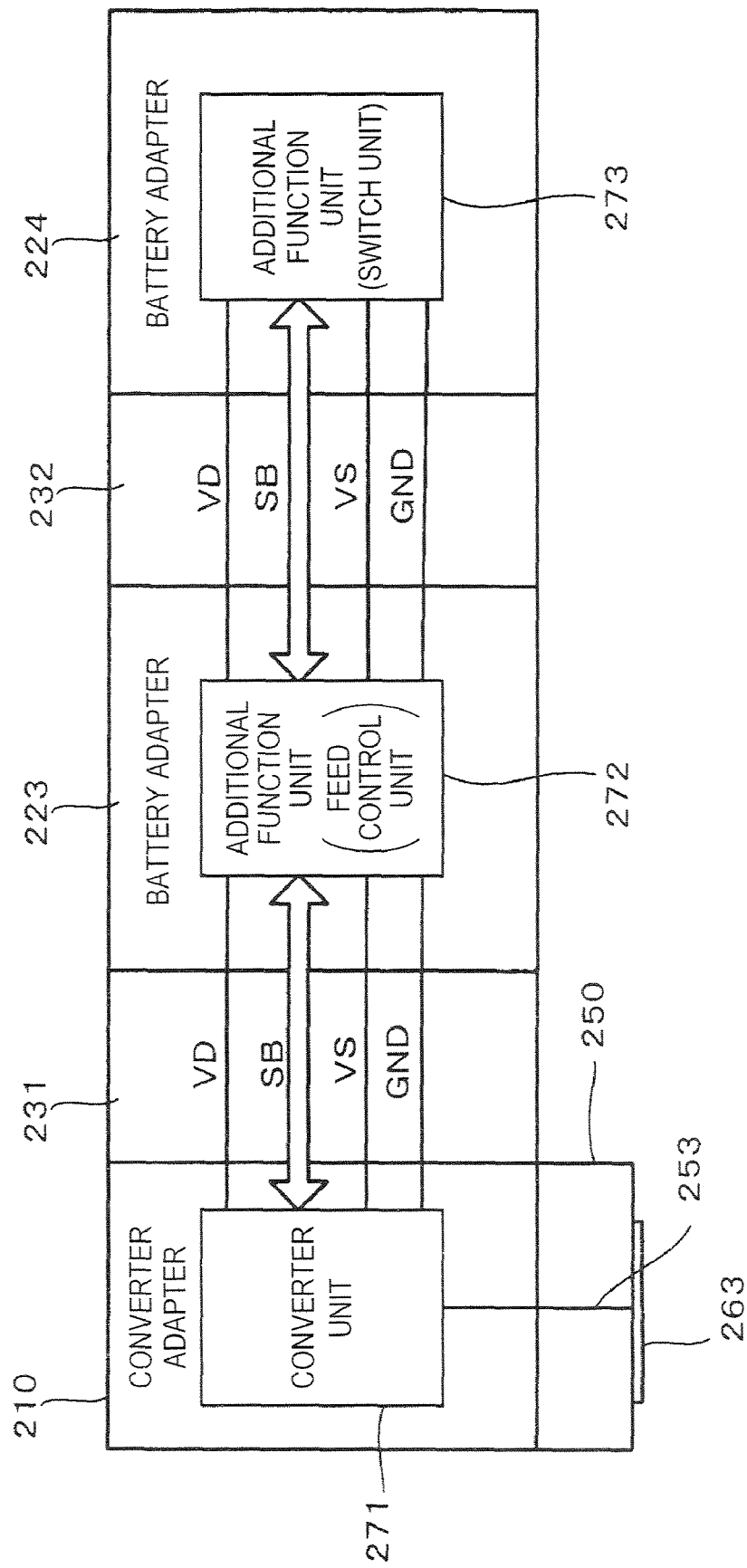
FIG. 23 shows connection relation between electric elements in the feed controller shown in FIG. 22.

FIG. 23 shows connection relation between electric elements in the feed controller shown in FIG. 22.

In FIGS. 22 and 23, similar reference numbers are given to parts corresponding to those discussed above and shown in FIGS. 20A and 20B and FIG. 21.

Similarly to the above examples, the structure shown in FIG. 22 has three battery adapters combined in a column to have shape and size corresponding to one real battery. However, the example shown in FIG. 22 has an assembly frame 250 including a structure member 251 which combines the battery adapters and other constituent member (this is also a battery adapter in the example shown in the figure) as one body for maintaining the assembled structure.

As can be easily seen from FIG. 22 as well as FIG. 23, the converter adapter 210 similar to that described with reference to FIG. 19 is disposed at a position corresponding to the positive electrode of the real battery. Also, the battery adapter 223 having the one additional function unit 272 corresponding to the feed control unit, for example, is connected at a position contacting the converter adapter 210 in a column via the point adapter 231. Furthermore, the battery adapter 224 having the other additional function 273 corresponding to the switch unit, for example, is connected at a position corresponding to the negative electrode of the real battery next to the battery adapter 223 via the joint adapter 232.

The assembly frame 250 shown in FIG. 22 has a conductive path constituted by the conductor 253 disposed inside or at an appropriate position of the assembly frame 250 or supplying power source to the converter adapter 210 (to its converter unit 271). In FIG. 23, the function of this conductive path is shown as a line projecting downward from the block of the converter adapter 210.

The respective feed controllers shown in FIG. 23, i.e., the converter adapter 210, the other two battery adapters 223 and 224, and the two joint adapters 231 and 232 are similar to those described with reference to FIG. 21.

When the assembly frame 250 shown in FIG. 22 is used, the feed controllers as the battery adapters (210, 223 and 224) having relatively small outer casings each of which has size smaller than that of the real battery are combined with other constituent member (this member may be other feed controller as in the above example shown in the figure) into one body to have shape and size appropriate for the battery holder.

Moreover, the feed controllers are detachably attached to other constituent member. Thus, various battery adapters other than the converter adapter can be arbitrarily selected and used to provide various functions.

Figures 24A, 24B:
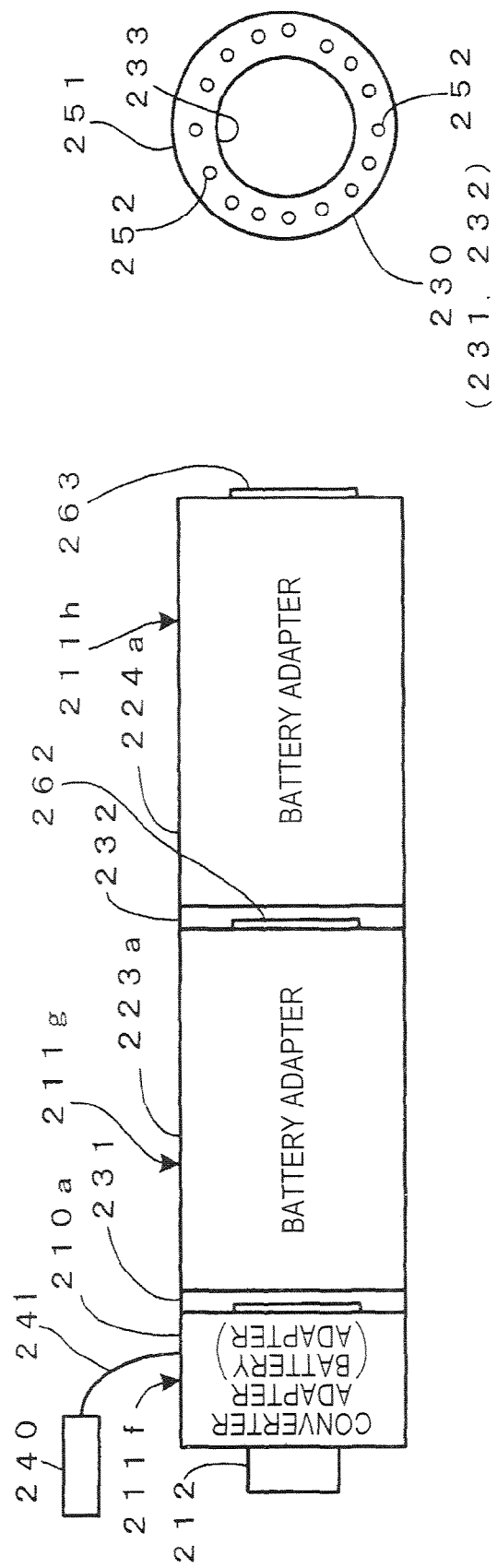

FIGS. 24A and 24B illustrate a mechanism of a feed controller in a still further example of the invention.

Figure 25:
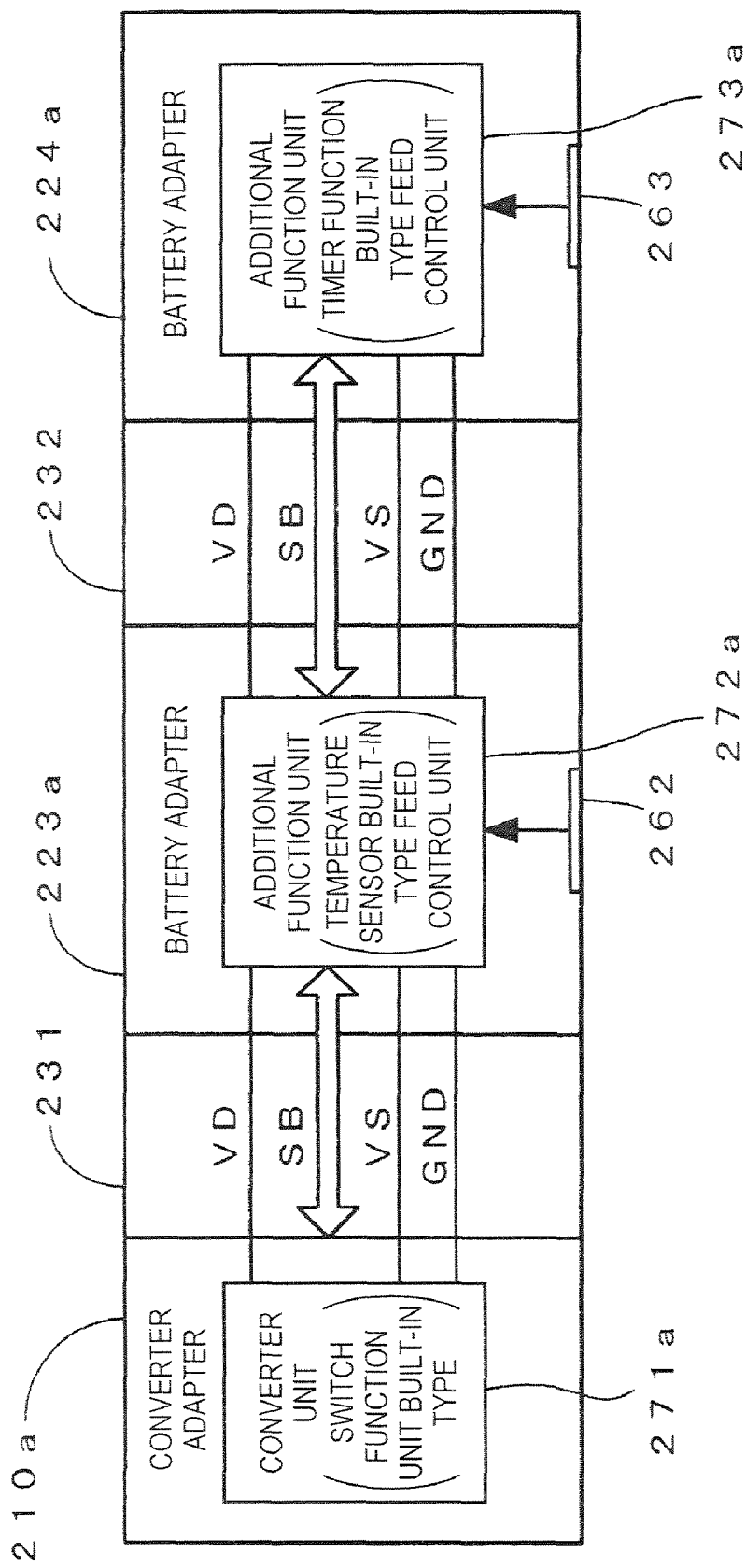
FIG. 25 shows connection relation between electric elements in the feed controller shown in FIGS. 24A and 24B.

FIG. 25 shows connection relation between electric elements in the feed controller shown in FIGS. 24A and 24B.

In FIGS. 24A and 24B and FIG. 25, similar reference numbers are given to parts corresponding to those discussed above and shown in FIGS. 20A and 20B and FIG. 21.

Similarly to the above examples, the structure shown in FIGS. 24A and 24B has three battery adapters combined in a column to have shape and size corresponding to one real battery. However, a converter adapter 210a containing a switch function unit in the three battery adapters in the example shown in FIGS. 24A and 242 is provided as a battery adapter positioned closest to the positive electrode. Two battery adapters 223a and 224a disposed next to the converter adapter 210a have feed controllers 272a and 273a for generating feed control signals, respectively.

The converter adapter 210a has an outer casing 211f, and the battery adapters 223a and 224a have outer casings 211g and 211h, respectively.

As can be easily seen from FIGS. 24A and 24B as well as FIG. 25, the switch function built-in type converter adapter 210a described above is disposed at a position corresponding to the positive electrode of the real battery. Also, the battery adapter 223a containing a temperature sensor built-in feed control unit provided with a sensor module for detecting temperature as an additional function unit 272a as one body is connected at a position contacting the converter adapter 210a in a column via the joint adapter 231. Furthermore, the battery adapter 224a containing a timer function built-in feed control unit for performing timing operation as another function unit 273a is connected at a position corresponding to the negative electrode of the real battery next to the battery adapter 223a via the joint adapter 232.

The operation performed by the combination of the battery adapters shown in FIGS. 24A and 24B and FIG. 25 is further explained.

The battery adapter 210a is similar to that in the above examples in the point that the converter unit is provided. However, the converter unit in this example is a switch function built-in type converter unit which further includes a switch unit (switch function unit) inserted into the feed path 1 for supplying output from the converter unit to the predetermined loads to open and close the feed path according to the feed control signal as one body.

In this structure, the feed control signal is supplied from the battery adapter 223a or battery adapter 224a to the switch unit (switch function unit) of the battery adapter 210a as the converter adapter to open or close the switch unit.

For example, the feed control signal for performing failsafe operation of cutting off power supply to the loads by the function of the temperature sensor built-in control unit is supplied from the battery adapter 223a at the time of excessive increase in the environmental temperature, or the feed control signal for limiting time of power supply to the loads by the function of the timber function built-in feed control unit is supplied from the battery adapter 224a.

Moreover, power supply can be controlled by actuating the temperature sensor of the battery adapter 223a or effecting the detection output from the temperature sensor within a limited predetermined period without direct control over power supply to the loads by the timer function of the battery adapter 224a.

Figure 26:
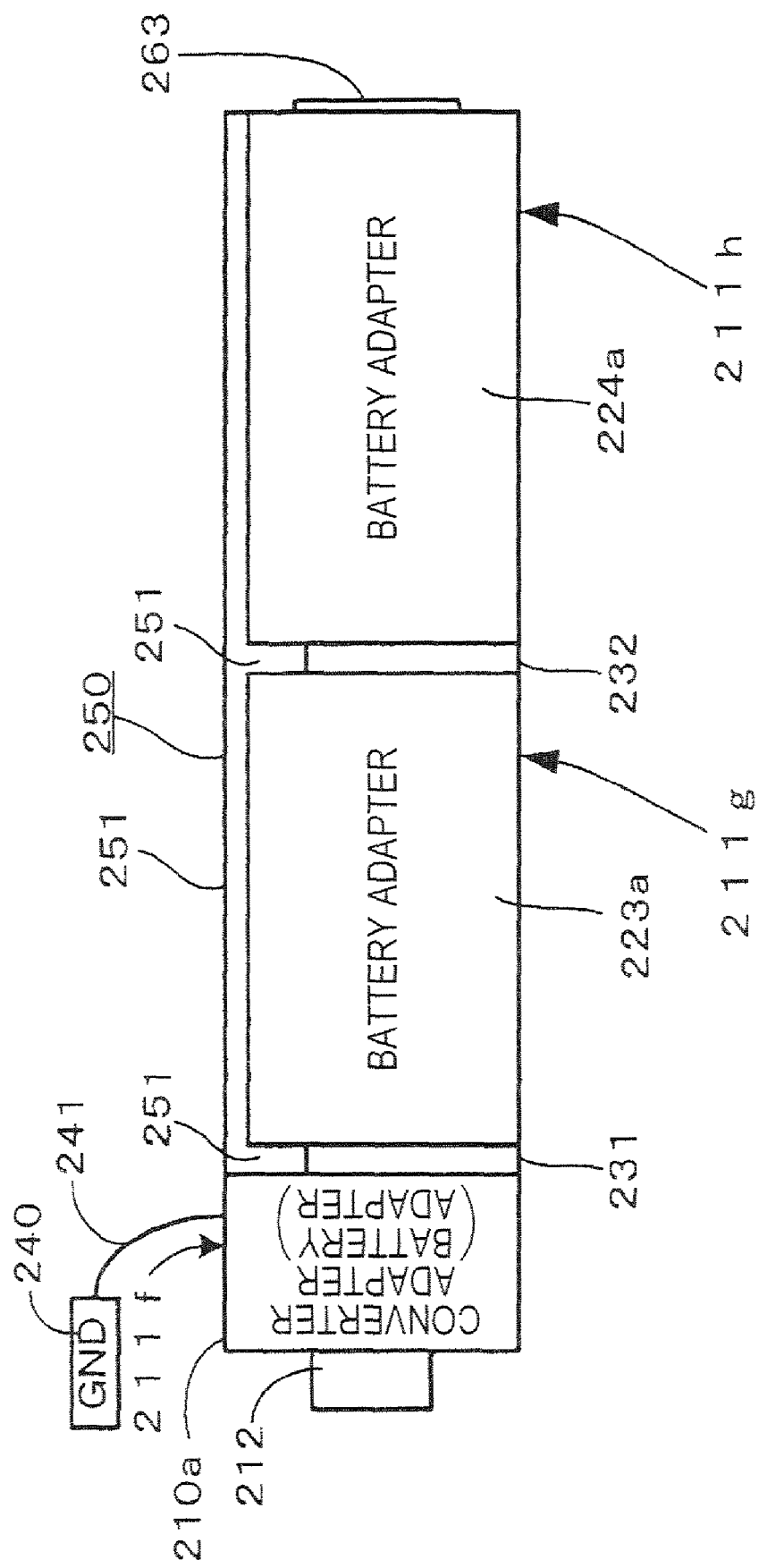
FIG. 26 illustrates a still further structure example of the feed controller as an example of the invention.

FIG. 26 illustrates a mechanism of a feed controller in a still further example of the invention.

Figure 27:
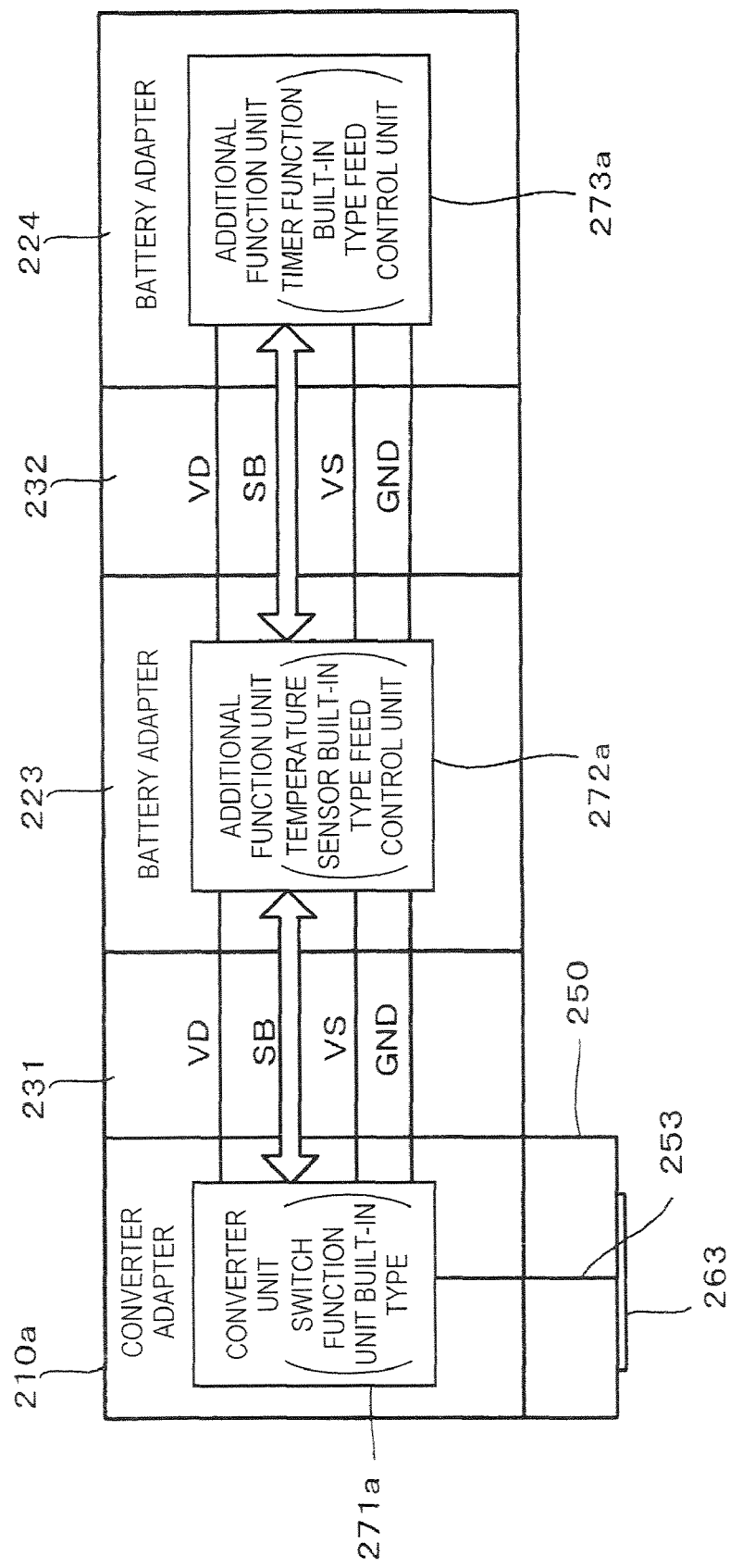
FIG. 27 shows connection relation between electric elements in the feed controller shown in FIG. 26.

FIG. 27 shows connection relation between electric elements in the feed controller shown in FIG. 26.

In FIGS. 26 and 27, similar reference numbers are given to parts corresponding to those discussed above and shown in FIG. 22 through FIG. 25.

As can be easily seen from the comparison between FIGS. 26 and 22, the structure shown in FIG. 26 has the assembly frame 250 similar to that shown in FIG. 22 to assemble three battery adapters in a column into a structure having shape and size corresponding to one real battery.

The respective battery adapters 210a, 223a and 224a are similar to those described with reference to FIGS. 24A and 249 and FIG. 25 including the point that the battery adapter 210a has the outer casing 211f and that the battery adapters 223a and 224a have the outer casings 211g and 211h.

More specifically, the switch function built-in type converter adapter 210a is disposed at a position corresponding to the positive electrode of the real battery. Also, the battery adapter 223a having the temperature sensor built-in type feed control unit provided with the sensor module for detecting temperature as the additional function unit 272a as one body is connected at a position contacting the converter adapter 210a in a column via the joint adapter 231. Furthermore, the battery adapter 224a having the timer function built-in type feed control unit for performing timing operation as the other additional function 273a is connected at a position corresponding to the negative electrode of the real battery next to the battery adapter 223a via the joint adapter 232.

The operation of the combination of the battery adapters described with reference to FIGS. 26 and 27 is similar to that described with reference to FIGS. 24A and 24B and FIG. 25.

More specifically, the feed control signal is supplied from the battery adapter 223a or battery adapter 224a to the switch function unit of the battery adapter 210a as the converter adapter to open or close the switch function unit.

For example, the feed control signal for performing failsafe operation for cutting off power supply to the loads by the function of the temperature sensor built-in control unit is supplied from the battery adapter 223a at the time of excessive increase in the environmental temperature, or the feed control signal for limiting time for power supply to the loads by the function of the timer function built-in feed control unit is supplied from the battery adapter 224a.

Moreover, power supply can be controlled by actuating the temperature sensor of the battery adapter 223a or effecting the detection output from the temperature sensor within a limited predetermined period without direct control over power supply to the loads by the timer function of the battery adapter 224a.

The entire disclosure of Japanese Patent Application Nos: 2008-037350, filed Feb. 19, 2008 and 2008-037351, filed Feb. 19, 2008 are expressly incorporated by reference herein.

What is claimed is:

1. A feed controller adopted to be included in a battery drive type device, the feed controller adopted to supply power to a predetermined load from a battery holder that obtains rated electromotive force from plural rated number of batteries having predetermined specification and connected in series while held by the battery holder, the feed controller comprising:

an outer casing attached to the battery holder in place of one of the plural batteries and having shape and size appropriate for being held by the battery holder;

a converter unit disposed within the outer casing to receive voltage corresponding to the sum of the electromotive forces from the other batteries when the outer casing is held by the battery holder in place of the one battery and convert the supplied voltage to output voltage corresponding to the rated electromotive force;

a switch unit inserted into a feed path for supplying the output from the converter unit to the predetermined load to open and close the feed path according to a feed control signal; and a feed control unit which generates the feed control signal to be supplied to the switch unit.

2. The feed controller according to claim 1, wherein the switch unit opens and closes a feed path to a main function unit as the load in the battery drive type device.

3. The feed controller according to claim 2, wherein the switch unit opens and closes the feed path to a receiving circuit as the main function unit in a radio receiver as the battery drive type device.

4. The feed controller according to claim 2, wherein the switch unit opens and closes the feed path to a communication function unit as the main function unit in a portable information device as the battery drive type device.

5. The feed controller according to claim 2, wherein the switch unit opens and closes the feed path to a light source as the main function unit in a lighting device as the battery drive type device.

6. The feed controller according to claim 1, wherein the feed control unit generates the feed control signal based on output from a predetermined timer circuit performing timing operation.

7. The feed controller according to claim 1, wherein the feed control unit generates the feed control signal for opening and closing the feed path in a manner determined according to predetermined movement pattern based on detection output from a motion sensor.

8. The feed controller according to claim 1, wherein the feed control unit has a voltage detecting circuit which detects voltage supplied from the other batteries when the outer casing is held by the battery holder in place of the one battery to generate the feed control signal based on voltage detected by the voltage detecting circuit.

9. The feed controller according to claim 1, wherein the outer casing obtains shape and size appropriate for being held by the battery holder when combined with other predetermined constituent member.

10. The feed controller according to claim 1, wherein the outer casing accommodates the switch unit and the feed control unit as well as the converter unit.

11. The feed controller according to claim 9, wherein the constituent member accommodates the switch unit and the feed control unit.

12. A feed controller adopted to be included in a battery drive type device, the feed controller adopted to supply power to a predetermined load from a battery holder that obtains rated electromotive force from plural rated number of batteries having predetermined specification and connected in series while held by the battery holder, the feed controller comprising:
- an outer casing attached to the battery holder in place of one of the plural batteries and having shape and size appropriate for being held by the battery holder;
- a converter unit disposed within the outer casing to receive voltage corresponding to the sum of the electromotive forces from the other batteries when the outer casing is held by the battery holder in place of the one battery and convert the supplied voltage to output voltage corresponding to the rated electromotive force;
- a switch unit inserted into a feed path for supplying the output from the converter unit to the predetermined load to open and close the feed path according to a feed control signal; and
- a feed control unit which generates the feed control signal to be supplied to the switch unit,
- wherein the feed control unit has a transmission information receiving section for receiving transmission information supplied from the outside of the battery drive type device to generate the feed control signal based on the transmission information received by the transmission information receiving section.

13. The feed controller according to claim 12, wherein:
- the outer casing is so constructed as to be appropriate for a battery holder of a lighting device as the battery drive type device;
- the switch unit is inserted into a power supply path to a light source of the lighting device as the load; and
- the feed control unit generates the feed control signal for modulating illumination light emitted from the light source according to the transmission information received by the transmission information receiving section.

14. The feed controller according to claim 12, wherein the transmission information receiving section has short-distance high-speed wireless network interface suited for predetermined mobile communication to receive the transmission information by using the short-distance high-speed wireless network interface.

15. The feed controller according to claim 14, wherein the short-distance high-speed interface receives a short-distance high-speed wireless signal generated from a predetermined PDA.

16. The feed controller according to claim 12, wherein the transmission information receiving section has a sensor interface for receiving information obtained from a sensor detecting an amount of a predetermined material phenomenon condition.

17. The feed controller according to claim 16, wherein the sensor interface receives information received by a predetermined temperature sensor.

18. The feed controller according to claim 12, wherein the feed control unit generates the feed control signal such that the transmission information received by the transmission information receiving section can be carried on an optical signal conforming to a predetermined code system.

* * * * *